(12) United States Patent
Shapira et al.

(10) Patent No.: US 7,107,464 B2
(45) Date of Patent: Sep. 12, 2006

(54) VIRTUAL PRIVATE NETWORK MECHANISM INCORPORATING SECURITY ASSOCIATION PROCESSOR

(75) Inventors: Yaniv Shapira, Bet Dagan (IL); Drory Shohat, Ramat Gan (IL); Moshe Zezak, Rishon Letzionn (IL); Niv Gilboa, Kfar Saba (IL)

(73) Assignee: Telecom Italia S.p.A., Milan (IT)

( * ) Notice: Subject to any disclaimer, the term of this patent is extended or adjusted under 35 U.S.C. 154(b) by 1278 days.

(21) Appl. No.: 09/902,770

(22) Filed: Jul. 10, 2001

(65) Prior Publication Data

US 2004/0117653 A1   Jun. 17, 2004

(51) Int. Cl.
*G06F 17/00* (2006.01)

(52) U.S. Cl. .................... 713/201; 713/150; 709/200
(58) Field of Classification Search ......... 713/150–153, 713/200–202; 709/200
See application file for complete search history.

(56) References Cited

U.S. PATENT DOCUMENTS

| | | | |
|---|---|---|---|
| 5,384,524 A | 1/1995 | Romano | 318/569 |
| 5,501,535 A | 3/1996 | Hastings et al. | 400/88 |
| 5,672,929 A | 9/1997 | Gutsell et al. | 310/319 |
| 5,809,025 A | 9/1998 | Timbs | 370/400 |
| 5,974,499 A | 10/1999 | Norman et al. | 711/103 |
| 5,983,350 A | 11/1999 | Minear et al. | 713/201 |
| 6,006,259 A | 12/1999 | Adelman et al. | 709/223 |
| 6,021,459 A | 2/2000 | Norman et al. | 711/5 |
| 6,055,236 A | 4/2000 | Nessett et al. | 370/389 |
| 6,061,749 A | 5/2000 | Webb et al. | 710/65 |
| 6,073,204 A | 6/2000 | Lakhani et al. | 711/100 |
| 6,078,957 A | 6/2000 | Adelman et al. | 709/224 |
| 6,078,985 A | 6/2000 | Lakhani et al. | 711/5 |
| 6,118,724 A | 9/2000 | Higginbottom | 365/230.05 |
| 6,154,839 A | 11/2000 | Arrow et al. | 713/154 |
| 6,157,955 A | 12/2000 | Narad et al. | 709/228 |
| 6,173,399 B1 | 1/2001 | Gilbrech | 713/153 |
| 6,175,891 B1 | 1/2001 | Norman et al. | 711/5 |
| 6,175,917 B1 | 1/2001 | Arrow et al. | 713/1 |
| 6,182,226 B1 | 1/2001 | Reid et al. | 713/201 |
| 6,185,409 B1 | 2/2001 | Threadgill et al. | 455/12.1 |
| 6,195,674 B1 | 2/2001 | Elbourne et al. | 708/402 |
| 6,212,123 B1 | 4/2001 | Norman et al. | 365/230.3 |
| 6,226,751 B1 | 5/2001 | Arrow et al. | 713/201 |

OTHER PUBLICATIONS

Enabling flexible working using hybrid IP VPNs, Hubbard, T.; Telecommunications Network Strategy and Planning Symposium. NETWORKS 2004, 11th International, Jun. 13–16, 2004.*
Mobile IP and virtual private networks, Bhagavathula, R.; Thanthry, N.; Pendse, R.; Vehicular Technology Conference, 2002. Proceedings. VTC 2002–Fall. 2002 IEEE 56th, vol.: 4, Sep. 24–28, 2002.*
A planning framework far implementing virtual private networks, Yurcik, W.; Doss, D.; IT Professional, vol.: 3, Issue: 3, May–Jun. 2001.*
William Stalling, Cryptography and Network Security: Principles and Practice, Chapter 13, Second Edition, New Jersey 1999.

* cited by examiner

*Primary Examiner*—David Jung
(74) *Attorney, Agent, or Firm*—Zaretsky & Associates PC; Howard Zaretsky

(57) ABSTRACT

A novel and useful virtual private network (VPN) mechanism and related security association processor for maintaining the necessary security related parameters to perform security functions such as encryption, decryption and authentication. A security association database (SAD) and related circuitry is adapted to provide the necessary parameters to implement the IPSec group of security specifications for encryption/decryption and authentication. Each security association (SA) entry in the database comprises all the parameters that are necessary to receive and transmit VPN packets according to the IPSec specification.

78 Claims, 15 Drawing Sheets

VIRTUAL PRIVATE NETWORK MECHANISM INCORPORATING SECURITY ASSOCIATION PROCESSOR

FIELD OF THE INVENTION

The present invention relates generally to data communication systems and more particularly relates to a mechanism for implementing virtual private networks (VPNs) incorporating a security association database and associated processor.

BACKGROUND OF THE INVENTION

In recent years, the world has witnessed the explosive growth of the Internet. Each year many more hosts are added while the number of users seems to be growing without limit. The Internet enables communications using different techniques including remote computer login, file transfer, world wide web (WWW) browsing, email, etc. Various protocols have been designed and are in use on the Internet to handle various types of communications. For example, file transfer protocol (FTP) for file transfer, hypertext markup language (HTML) for web traffic, etc. Generally, the protocol related to Internet communications are grouped under the umbrella of the transmission control protocol/internet protocol (TCP/IP) suite of protocols that includes protocols at various layers of the OSI communications stack.

A key feature of the Internet is that it is a public network that is accessible by nearly anyone with a computer, telephone line and Internet service provider (ISP) account. A downside to this wide scale public accessibility is that it permits easy access to hackers and others intent on carrying out malicious activities against one or more hosts on the Internet. Illegal conduct such as stealing of secret information or the deletion of important files by a malicious user is possible by a hacker that manages to break into a computer of a remote network and succeed to tap communication data. The need for security was addressed by the Internet Architecture Board (IAB) by including security features such as encryption and authentication in IPv6 that permit secure transactions over the Internet.

To combat the threat of hackers and to secure private networks, it is common today to place a firewall at the entrance of the private network in a company or organization. The firewall employs some form of packet filter that functions to enforce a user defined security policy. The firewall is a system that sits at the boundary between the local network of the organization and the global Internet. It implements the filtering of all data communications in order to prevent leakage of information out to the external network and to prevent unauthorized access of the internal network from the outside. A deny/allow decision is made for each packet that is received by the firewall.

At the same time, the world is witnessing increasing demand for wireless services (i.e. cellular phones, two way pagers, cordless devices, etc.) and personal computing devices such as laptops, PDAs, etc. Many of these personal computing devices incorporate wireless communications circuitry to enable them to communicate via wireless networks (e.g., cellular or other broadband schemes) to WAN networks such as the Internet. Thus, more and more PDAs and cellular telephones are being connecting to the Internet thus exposing these devices to security risks. Preferably, these devices employ some type of firewall to protect against unauthorized access to the device. Most firewalls today, however, are implemented in software and require the computing resources of an entire desktop computer, making their use in a portable computing device such as cellular telephone or PDA very costly or impractical.

Thus, there is a need for a firewall or packet filter that can be easily implemented in hardware in small size suitable for incorporation in small portable electronic computing devices such as cellular telephones and wireless connected PDAs.

SUMMARY OF THE INVENTION

The present invention provides a novel and useful virtual private network (VPN) mechanism for providing the necessary security related parameters to perform encryption/decryption and authentication. The VPN mechanism is adapted to be suitable for implementation in hardware at relatively low cost thus enabling cost effective incorporation of the invention in to portable electronic communications device such as cellular telephones, personal digital assistants (PDAs), laptop computers, etc. in connecting to the Internet or other wide area network.

The present invention can be used in conjunction with a hardware-or software based firewall in portable computing devices such as cellular telephones and wireless connected PDAs that are adapted to connect to the Internet. The VPN mechanism of the present invention may also be implemented in software or a combination of hardware and software.

Thus, the VPN mechanism can be used to achieve, for example, secure branch office connectivity over the WAN, secure remote access over the WAN or securing e-commerce transactions over the WAN.

The VPN mechanism comprises a security association database (SAD) and related circuitry that is adapted to provide the necessary parameters to implement the IPSec group of security specifications for encryption/decryption and authentication. Each security association (SA) entry in the database comprises all the parameters that are necessary to receive and transmit VPN packets according to the IPSec specification.

The invention performs security association (SA) related processing on an input packet stream. Note that the input packet stream may comprise both inbound and outbound packets. Typically, the invention is positioned between a WAN (i.e. the Internet) and a local LAN. In this case, the VPN mechanism is operative to filter both inbound packets sent from the WAN to the LAN and outbound packets sent from the LAN to the WAN.

The VPN mechanism of the present invention is operative to maintain a security parameter table referred to as the SAD for storing the security related parameters related to a one way connection. For a two way connection, two SAs need to be created. New security associations are added to the SA database and, once created, subsequent packets associated with this SA are processed in accordance with the parameters stored in the database for the particular SA. Depending on the packet and the SA parameters, the packet may be encrypted, decrypted, authenticated or dropped. Note that a packet is allowed only if the packet conforms to the security as specified in the SA database.

Although the invention is especially suited for implementation in hardware, it can also be implemented in software. In one embodiment, a computer comprising a processor, memory, etc. is operative to execute software adapted to perform the VPN mechanism and security association processing of the present invention.

There is provided in accordance with the present invention a security association processor circuit comprising a security association database for storing security related data for a plurality of security associations, each entry comprising security association related data corresponding to a unique socket, means for opening a new security association upon receipt of a socket not found in the security association database, means for searching for and recognizing a security association associated with a packet in accordance with its socket, means for retrieving from the security association database a plurality of security related parameters and means for forwarding the plurality of security related parameters to a Virtual Private Networking (VPN) security processor for performing one or more security processes therewith.

There is also provided in accordance with the present invention a Virtual Private Network (VPN) circuit comprising security association database means for storing security related data for a plurality of security associations, each entry comprising security association related data corresponding to a unique socket, a plurality of security engines, each security engine adapted to perform a security process, means for opening a new security association upon receipt of a socket not found in the security association database means, means for searching for and recognizing a security association associated with an input packet in accordance with its socket, means for retrieving from the security association database means a plurality of security related parameters, means for forwarding the plurality of security related parameters to at least one of the security engines for performing a security process therewith and packet building means adapted to construct an output packet in accordance with a particular security mode utilizing the input packet and the results of the security process.

There is further provided in accordance with the present invention a portable computing device comprising communication means adapted to connect the device to a communications network, memory means comprising volatile and non-volatile memory, the non-volatile memory adapted to store program code, a processor coupled to the memory means and the communication means for executing the program code and a Virtual Private Network (VPN) circuit comprising security association database means for storing security related data for a plurality of security associations, each entry comprising security association related data corresponding to a unique socket, a plurality of security engines, each security engine adapted to perform a security process, means for opening a new security association upon receipt of a socket not found in the security association database means, means for searching for and recognizing a security association associated with an input packet in accordance with its socket, means for retrieving from the security association database means a plurality of security related parameters, means for forwarding the plurality of security related parameters to at least one of the security engines for performing a security process therewith, packet building means adapted to construct an output packet in accordance with a particular security mode utilizing the input packet and the results of the security process.

There is also provided in accordance with the present invention a security association processor circuit comprising a security association database for storing security related data for a plurality of security associations, each entry comprising security association related data corresponding to a unique socket, a management unit adapted to open a new security association upon receipt of a socket not found in the security association database, a recognition unit adapted to search for and recognize a security association associated with an input packet in accordance with its socket, a main processor unit adapted to retrieve from the security association database a plurality of security related parameters and forward them to a Virtual Private Networking (VPN) security processor for performing one or more security processes therewith and a hash unit comprising a hash function and associated hash table for facilitating the search for stored security associations.

There is further provided in accordance with the present invention a method of security association, the method comprising the steps of establishing a security association database adapted to store security related data for a plurality of security associations, each entry within the security association database corresponding to a socket, opening a new security association upon receipt of a socket not found in the security association database, searching for and recognizing a security association associated with a packet in accordance with its socket, retrieving from the security association database a plurality of security related parameters and forwarding the plurality of security related parameters to a Virtual Private Networking (VPN) security processor for performing one or more security processes therewith.

There is also provided in accordance with the present invention a computer readable storage medium having computer readable program code means embodied therein for causing a suitably programmed computer to a security association mechanism when such program is executed on the computer, the computer readable storage medium comprising computer readable program code means for causing the computer to establish a security association database for storing security related data for a plurality of security associations, each entry comprising security association related data corresponding to a unique socket, computer readable program code means for causing the computer to open a new security association upon receipt of a socket not found in the security association database, computer readable program code means for causing the computer to search for and recognizing a security association associated with a packet in accordance with its socket, computer readable program code means for causing the computer to retrieve from the security association database a plurality of security related parameters and computer readable program code means for causing the computer to forward the plurality of security related parameters to a Virtual Private Networking (VPN) security processor for performing one or more security processes therewith.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
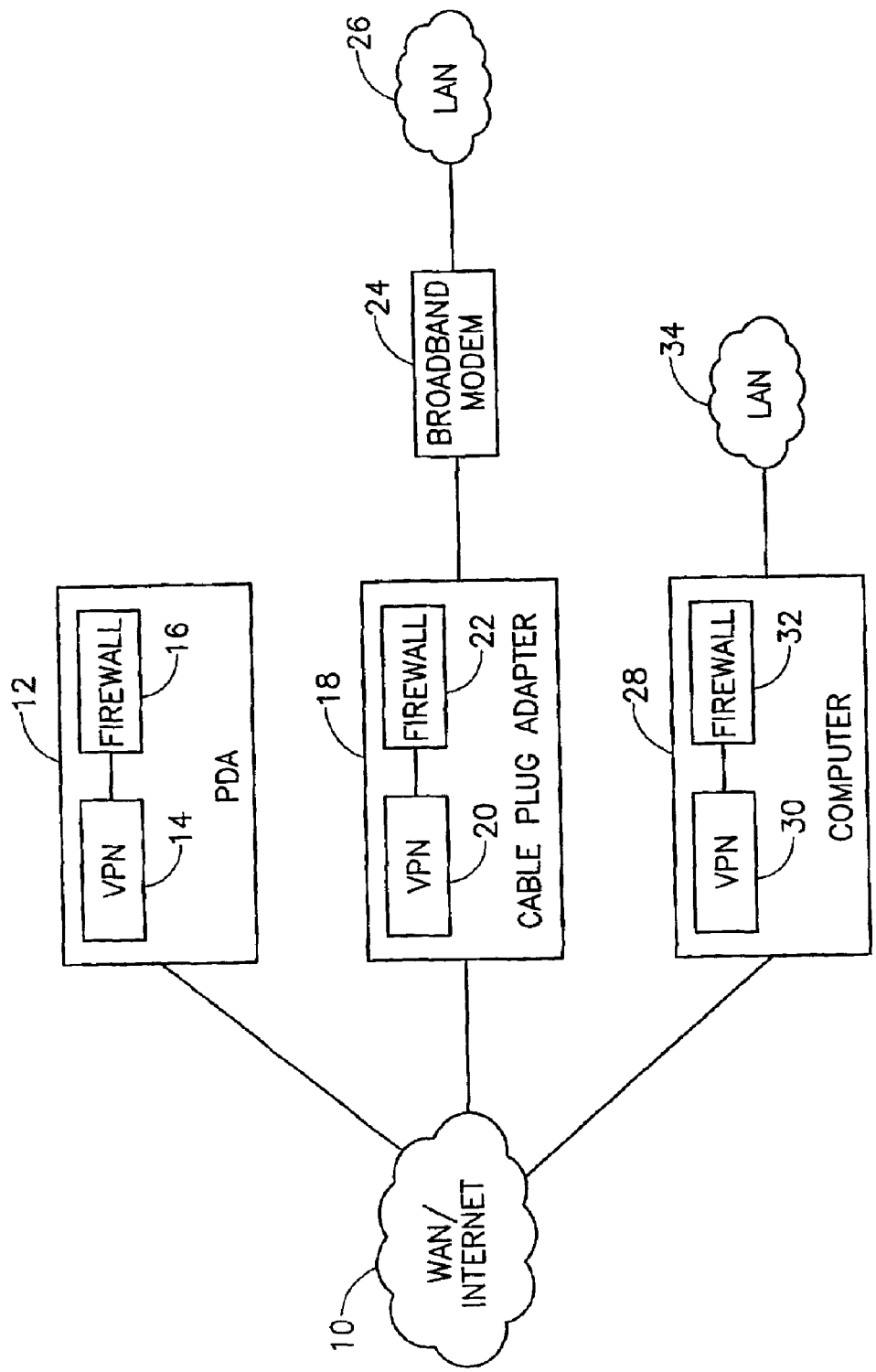
FIG. 1 is a block diagram illustrating several example applications of the virtual private network mechanism of the present invention in the context of a WAN or Internet.

The following notation is used throughout this document.

| Term | Definition |
| --- | --- |
| ARP | Address Resolution Protocol |
| ARW | Anti-Replay Window |
| ASIC | Application Specific Integrated Circuit |
| ADSL | Asymmetric Digital Subscriber Line |
| AH | Authentication Header |
| CPU | Central Processing Unit |
| CRC | Cyclic Redundancy Check |
| CBC | Cipher Block Chaining |
| DES | Data Encryption Standard |
| DAT | Digital Audio Tape |
| DSP | Digital Signal Processor |
| DSL | Digital Subscriber Line |
| DVD | Digital Versatile Disk |
| EEPROM | Electrically Erasable Programmable Read Only Memory |
| EEROM | Electrically Erasable Read Only Memory |
| ECB | Electronic Codebook |
| ESP | Encapsulating Payload Security |
| ED | Encryption/Decryption |
| EPROM | Erasable Programmable Read Only Memory |
| FPGA | Field Programmable Gate Array |
| FTP | File Transfer Protocol |
| HMAC | Header Message Authentication Code |
| HDSL | High bit rate Digital Subscriber Line |
| HTML | Hyper Text Markup Language |
| IAB | Internet Architecture Board |
| ICMP | Internet Control Message Protocol |
| IKE | Internet Key Exchange |

-continued

| Term | Definition |
| --- | --- |
| IP | Internet Protocol |
| ISP | Internet Service Provider |
| IV | Initial Vector |
| IPSec | IP Security |
| LRU | Least Recently Used |
| LAN | Local Area Network |
| MTU | Maximum Transfer Unit |
| MAN | Metropolitan Area Network |
| MRU | Most Recently Used |
| NIC | Network Interface Card |
| OSI | Open Systems Interconnect |
| PB | Packet Builder |
| PC | Personal Computer |
| PDA | Personal Digital Assistant |
| PDU | Protocol Data Unit |
| RAM | Random Access Memory |
| RIP | Remote IP |
| ROM | Read Only Memory |
| SA | Security Association |
| SAP | Security Association Processor |
| SPD | Security Policy Database |
| SPI | Security Parameter Index |
| TCP | Transmission Control Protocol |
| UDP | User Datagram Protocol |
| VDSL | Very high bit rate Digital Subscriber Line |
| VPN | Virtual Private Network |
| WAN | Wide Area Network |
| WWW | World Wide Web |

DETAILED DESCRIPTION OF THE INVENTION

The present invention provides a novel and useful virtual private network (VPN) mechanism for providing the necessary security related parameters to perform encryption/decryption and authentication. The VPN mechanism is adapted to be suitable for implementation in hardware at relatively low cost thus enabling cost effective incorporation of the invention in to portable electronic communications device such as cellular telephones, personal digital assistants (PDAs), laptop computers, etc. in connecting to the Internet or other wide area network. The present invention can be used in conjunction with a hardware- or software based firewall in portable computing devices such as cellular telephones and wireless connected PDAs that are adapted to connect to the Internet. The VPN mechanism of the present invention may also be implemented in software or a combination of hardware and software.

The VPN mechanism comprises a security association database (SAD) and related circuitry that is adapted to provide the necessary parameters to implement the IPSec group of security specifications for encryption/decryption and authentication. Each security association (SA) entry in the database comprises all the parameters that are necessary to receive and transmit VPN packets according to the IPSec specification. Note that the SAs are initially negotiated during the Internet Key Exchange (IKE) procedure. Although the invention may be implemented in software, the mechanism is particular adapted to be implemented in hardware that can provide greatly accelerated security processing. Implementing the SAD and related processing in hardware enables all IPSec encryption/decryption and authentication processing to be performed in hardware. Note that this applies to VPN sessions wherein the SAs have already been established. It is noted that VPN sessions whereby the SA has not been established are very rare and thus would have a negligible effect on system performance.

IPSec provides security services at the IP layer by enabling a system to select the required security protocols, choose the algorithms to use and place into use the keys needed to provided the services. Two protocols are used in IPSec to provide security including an authentication protocol denoted Authentication Header (AH) and a combined encryption/authentication protocol denoted Encapsulating Security Payload (ESP). The security association or SA is used in both the AH and ESP mechanisms. The SA is defined as a one-way relationship between a sender and a receiver that affords security services to the traffic carried on it. Note that for a two-way secure exchange, two SAs are required.

The invention performs security association (SA) related processing on an input packet stream. Note that the input packet stream may comprise both inbound and outbound packets. Typically, the invention is positioned between a WAN (i.e. the Internet) and a local LAN. In this case, the VPN mechanism is operative to filter both inbound packets sent from the WAN to the LAN and outbound packets sent from the LAN to the WAN.

Note that the input stream may comprise any type of input data in accordance with the particular application, such as frames, packets, bytes, PDUs, etc. For illustration purposes only, the input data stream is considered a sequence of packets.

It is noted that the VPN mechanism and related module illustrated are presented as an example only and are not intended to limit the scope of the invention. One skilled in the electrical arts can construct other VPN modules, either in hardware, software or a combination of both to perform security related processing and VPN implementation using the principles of the present invention described herein without departing from the scope of the invention.

The VPN mechanism of the present invention is operative to maintain a security parameter table referred to as a security association database (SAD) for storing the security related parameters related to a one way connection. For a two way connection, two SAs need to be created. New security associations are added to the SA database and, once created, subsequent packets associated with this SA are processed in accordance with the parameters stored in the database for the particular SA. Depending on the packet and the SA parameters, the packet may be encrypted, decrypted, authenticated or dropped. Note that a packet is allowed only if the packet conforms to the security as specified in the SA database.

The VPN mechanism of the present invention has widespread applications in many different types of systems. A block diagram illustrating several example applications of the VPN mechanism of the present invention in the context of a WAN or Internet is shown in FIG. 1. Typically, the VPN mechanism is constructed and used in combination with a firewall to prevent unauthorized access to a protected network, as is shown in each of the three examples shown herein.

In the first example, the VPN mechanism 14 is used with a firewall 16 that is implemented in a personal computing type device 12 in a wired or wireless communication with a network 10 which may be a WAN or the Internet for example. The personal computing device may comprise any device, such as a Personal Digital Assistant (PDA), e.g., Palm handheld, a cellular telephone, wireless handset, etc. In this example, the VPN mechanism and associated firewall function to perform security processing bidirectionally on packets flowing between the WAN/Internet and the device.

In a second example, the VPN mechanism 20 is used in combination with a firewall 22 whereby both are implemented in a cable plug adapter 18 in wired or wireless communication with the WAN or Internet 10. The device 18 normally sits between the WAN/Internet and a broadband modem 24 which functions to connect a LAN 26 to the WAN/Internet. The VPN mechanism in the cable plug adapter functions to perform security processing on packets sent from the WAN/Internet to the LAN and vice versa. The broadband modem is adapted to modulate and demodulate a broadband signal such as xDSL, e.g., ADSL, HDSL, VDSL, etc., satellite, land based RF, microwave, etc.

In a third example, the VPN mechanism 30 is used with a firewall 32 wherein both are implemented on a stand alone computer 28, e.g., personal computer (PC), laptop, etc., in wired or wireless communication with the WAN or Internet. The computer containing the firewall is located between the WAN/Internet and the LAN 34 to be protected. The VPN mechanism functions to perform security processing on packets sent from the WAN/Internet to the LAN and vice versa.

Figure 2:
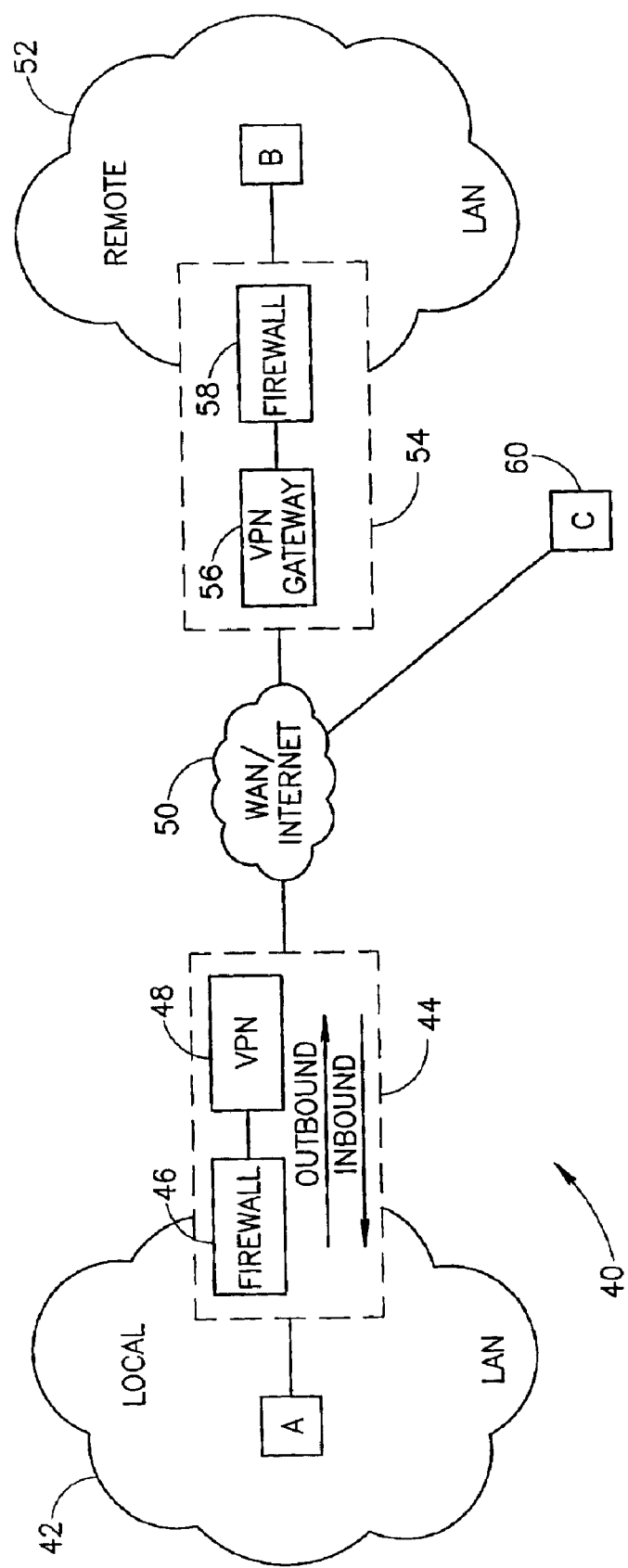
FIG. 2 is a block diagram illustrating an example network comprising a local and remote LAN, WAN and dial up user communicating the virtual private network mechanism of the present invention.

A block diagram illustrating an example network comprising a local and remote LAN, WAN and dial up user communicating the virtual private network mechanism of the present invention is shown in FIG. 2. This example network scenario, generally referenced 40, comprises two LANs, one local 42 and one remote 52. Three computers A, B and C are connected to the network and communicate with one another. A, B and C may comprise hosts, stations, users, etc. A VPN gateway 48 and firewall 46 sits at the entrance to the local LAN and a VPN gateway 56 and firewall 58 also is situated at the entrance to the remote LAN. The two LANs are connected via the WAN/Internet 50.

User C is also connected to the WAN/Internet via suitable means such as dial up modem, xDSL modem access, etc. and may comprise a VPN end user in which it incorporates a VPN gateway or may be a non-VPN connection.

In accordance with the present invention, the VPN mechanism is adapted to perform the security processing including creating, storing and managing the security parameters needed by one or more security processors in performing encryption, decryption, authentication, etc. The VPN mechanism is operative to process both inbound packets received from the WAN/Internet destined for the LAN and outbound packets the originate in LAN and are destined to the WAN/Internet.

In operation, plaintext outbound from the LAN is encrypted by the VPN and transmitted over the WAN. Similarly, cipher text inbound from the WAN is decrypted to plaintext by the VPN and forwarded over the LAN to the recipient. In accordance with the invention, the VPN mechanism is adapted to provide the necessary security parameters for implementing the IPSec specifications.

Figure 3:
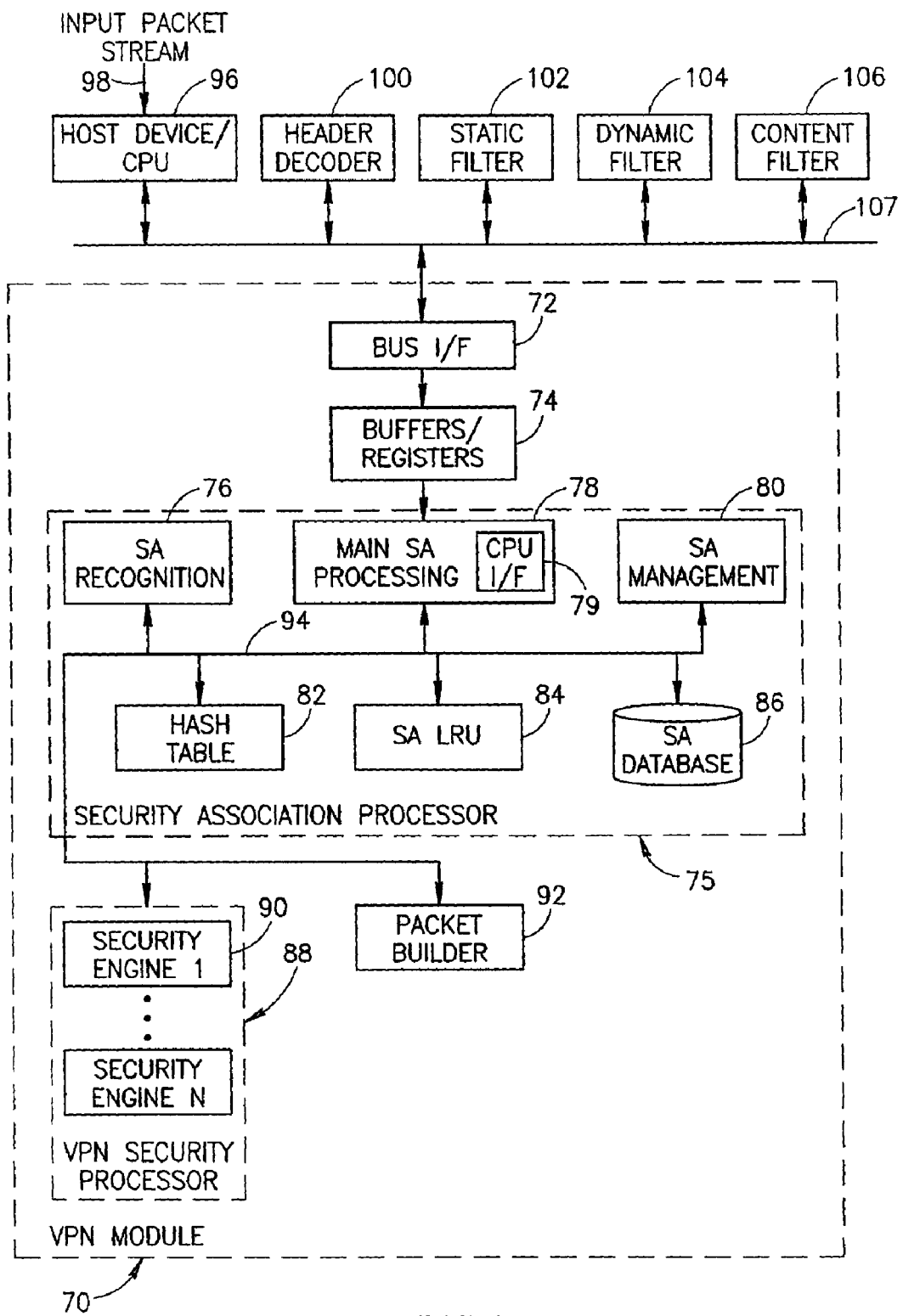
FIG. 3 is a block diagram illustrating the virtual private network mechanism of the present invention in more detail.

The invention comprises a VPN module constructed from a plurality of elements that together function to implement the VPN mechanism. A block diagram illustrating the VPN module of the present invention in more detail is shown in FIG. 3. The VPN module, generally referenced 70, comprises a bus interface 72, buffer/registers 74 a security association processor (SAP) 75 VPN security processor 88 and packet builder 92.

The security association processor comprises a SA recognition module 76, main SA processing module 78 incorporating a CPU interface 79, SA management module 80, hash table 82, SA Least Recently Used (LRU) circuit 84 and SA database 86 all of which are in communication over a bus with the security engines in the VPN security processor and the packet builder.

The VPN security processor comprises a plurality of security engines 90 each adapted and configured to perform a particular security related operation. For example, the VPN security processor comprises separate security engines for performing encryption, decryption, authentication, the DES algorithm, Header Message Authentication Code (HMAC), etc.

The VPN module communicates with a host device/CPU 96, header decoder 100, static filter 102, dynamic filter 104 and content search unit 106 over a bus 107 via the bus interface.

Note that throughout this document, it is assumed that the VPN module is normally located between a WAN and LAN and is operative to perform security processing on both inbound and outbound packets. Inbound packets refer to packets received from the WAN towards the LAN and outbound packets refer to packets received from the LAN towards the WAN. Thus, the input packet stream may comprise both inbound and outbound packets.

The input packet stream 98 is received by the host device/CPU and the contents thereof are forwarded to the header decoder which functions to decode (or parse) the header portion of the packet. The header decoder is operative to extract the fields of interest that are used by the VPN module. The data extracted by the header decoder is forwarded to the other modules including the static filter, dynamic filter and VPN module over the bus. The data includes two hash values, two sockets (one each for the dynamic filter and the SA processing) and type of packet, e.g., ICMP, ARP, TCP, UDP, etc. The socket for SA and VPN processing comprises SPI, RIP and the protocol. The socket for the dynamic filter comprises source and destination IP address, source and destination port and protocol. Note that depending on the implementation, the header decoder may be constructed as an external module or may be integral with the VPN module.

In operation, the VPN module is operative to open new SA including establishing connections to the LRU and hash linked lists, determining to which SA an input packet corresponds to, updating the state of the SA after successful processing of a packet and removing unused SAs from the connection table. Note that the SA database is implemented and arranged such that SA recognition and pointer management can be easily and quickly performed.

The main SA processing module functions as the main processing block of the security association processor. It opens new SAs, processes existing SAs and tracks the state of a SA. It also comprises circuitry adapted to implement an anti-replay mechanism including updating the anti-replay window for inbound packets, incrementing the sequence number on outbound packets/updating on inbound packets, detecting sequence number overflow.

The main SA processing module is also adapted to update the status associated with a SA including maintaining a set of flags, sequence numbering, decrementing lifetime variables and updating a status register after processing each packet. The main SA processor operates in a cyclic fashion for each received packet. The cycles include retrieving SA parameters from the SA database, processing the packet, i.e. encrypting, decrypting, etc. and updating the SA database once processing is complete. Note that the SA database is updated only when the security processing of the packet did not result in any errors and the packet was not rejected.

The main SA processing module also is adapted to count the number of bytes transferred on each SA per packet and generate a notification when the lifetime for a SA overflows. Upon an overflow detected, the manager closes (i.e. kills) the SA.

The SA recognition module functions to receive a socket and search in the SA database for a SA matching the socket. The socket is used to identify a SA and comprises a security parameter index (SPI), remote IP (RIP) and the security protocol identifier. The SPI comprises a 32 bit random number generated by the CPU after the IKE process that references a specific SA. The SPI is transported in the AH and ESP headers to enable the receiving station to select the SA under which a received packet will be processed. The remote IP is the IP address of the destination endpoint of the SA which may be an end user or a VPN gateway or any device with a VPN capability. The security protocol identifier indicates whether the SA is an AH or ESP SA, for example.

The SA management module functions to maintain the SA database. The SA database is managed using least recently used (LRU) doubly linked list and is accessed using a hash table. In addition, the manager functions to insert new SAs into the database on inbound and outbound packet flow. The manager also functions to make the SA associated with a matched packet the MRU, make available a number of unused SAs to the CPU upon demand, check the lifetime in terms of time for one or more SAs and when deleting a SA, update the LRU and hash linked lists and inform the dynamic filter the sessions associated with the SA to be deleted.

The SA database functions to store the socket and other SA related data, including SA state and current status, for use by the various processing modules of the VPN module. The hash table is used to accelerate the recognition of SAs. These components are described in more detail infra.

Main SA Processing

Figure 4A:
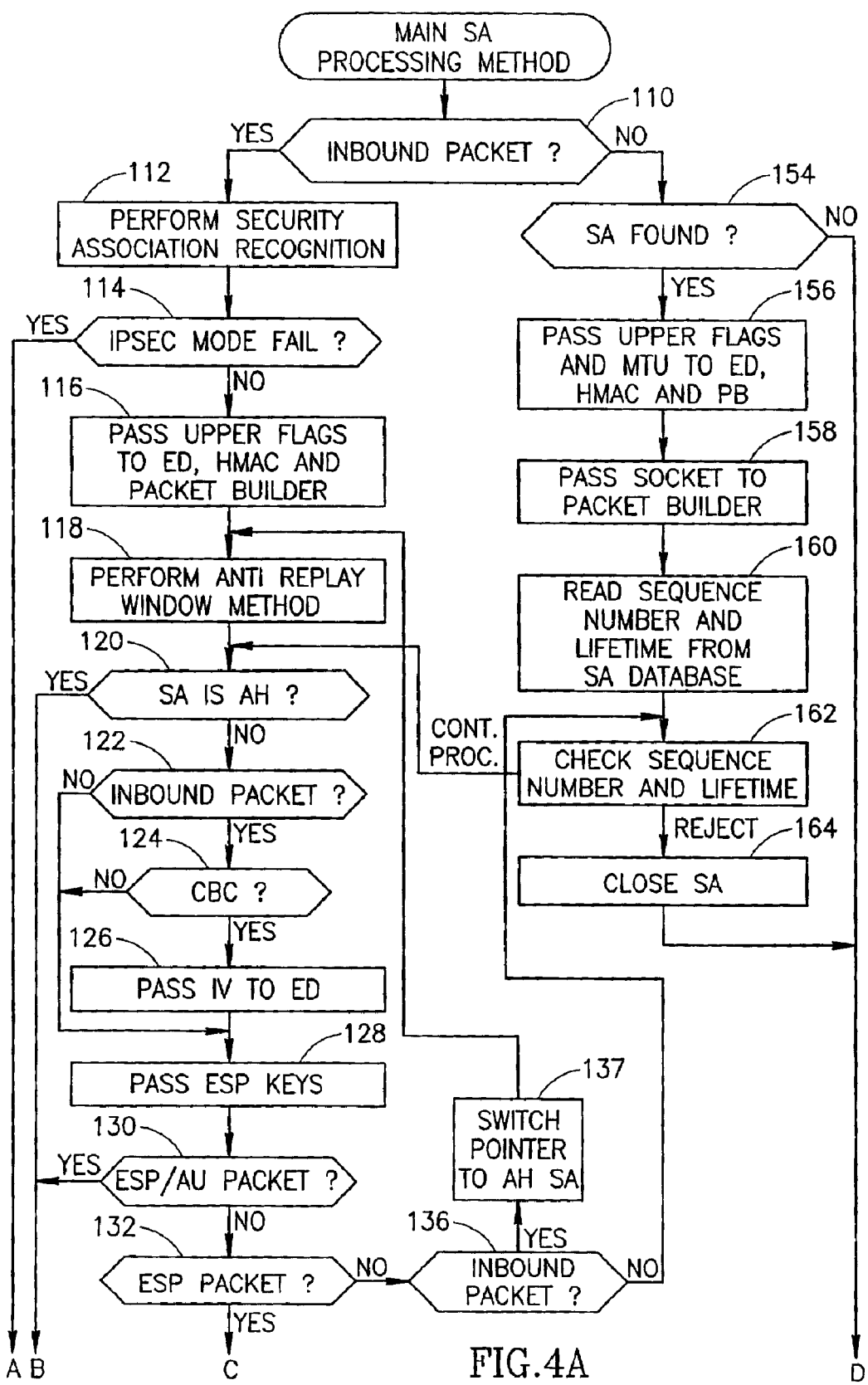
FIGS. 4A and 4B are a flow diagram illustrating the main SA processor method of the present invention.
Figure 4B:
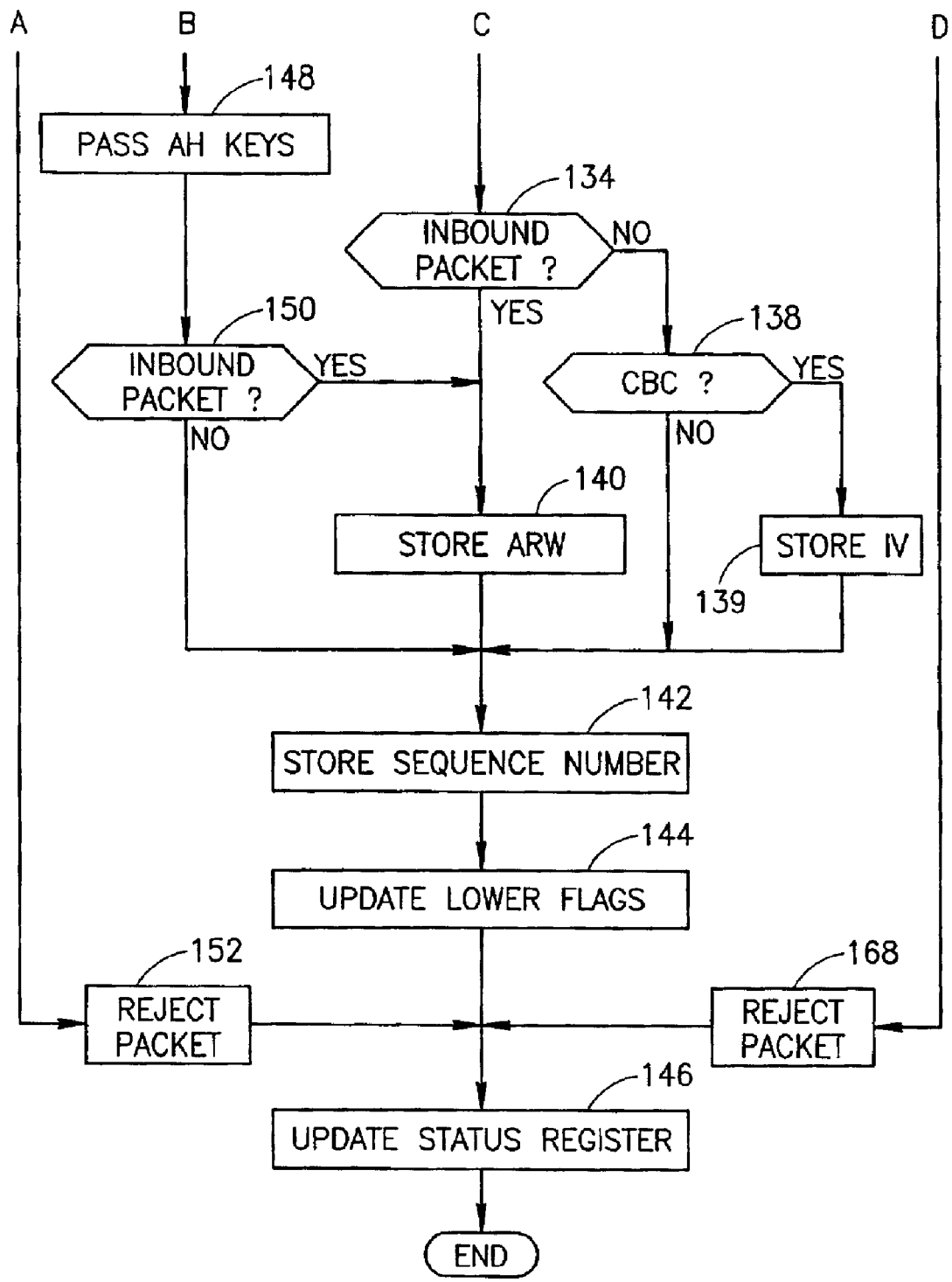

The main SA processing will now be described in more detail. A flow diagram illustrating the main SA processor method of the present invention is shown in FIGS. 4A and 4B. The VPN module and security association processor are constructed to process packet data in a three stage manner wherein SA data associated with the packet is read from the SA database in one stage, the data then processed in a second stage and the results of the processing written back to the SA database in a third stage. During the processing stage, one or more security procedures are performed on the packet and the SA state is tracked in accordance with the processing.

It is first checked whether the packet received is an inbound or outbound packet (step 110). If it is an outbound packet, it is then checked whether a SA was found by the dynamic filter (step 154). Normally, the dynamic filter searches its database for a session with a socket that matches that of the received packet. For each session there is stored a corresponding SA in the session database in the dynamic filter. Upon finding a matching session, the corresponding SA is read out and input to the SA processor. The operation of the dynamic filter is described in more detail in U.S. application Ser. No. 09/851,768, filed May 9, 2001, entitled "Dynamic Packet Filter Using Session Tracking," similarly assigned and incorporated herein in its entirety.

If no SA was found for the packet (step 154), the packet is rejected (step 168) since the packet cannot be processed without a SA and the status register is updated (step 146). In this case, the CPU is operative to open a new SA and store a pointer to the SA in the session database in the dynamic filter. The packet is then re-injected but this time the dynamic filter recognizes the session and passes the SA to the SA processor.

If a SA was found, the one or more security parameters are retrieved from the SA database and the packet maximum transfer units (MTU) and upper flags are transferred to one or more security engines in the VPN security processor (step 156). The MTU represents the maximum size of the packet that is allowed to be transmitted without fragmentation.

The encryption/decryption (ED) and Header Message Authentication Code (HMAC) are examples of security engines that perform a security function on the packet data. The data transferred to the ED security engine comprises the IPSec mode, the particular encryption algorithm (e.g., DES, 3DES, etc.), CBC or ECB, padding stream type (i.e. zeros or incrementing), the class of each DES in 3DES, encryption initial vector (IV) (only for CBC mode), the encryption key and the encrypt/decrypt instruction from the header decoder.

The data transferred to the HMAC security engine comprises the IPSec mode, authentication algorithm (e.g., SHA1, MD5, etc.), authentication header size (i.e. 96 or 160 bits) and the authentication key.

The socket is then passed to the packet builder (PB) for assembly as a packet (step 158). The data passed to the PB comprises the particular IPSec mode, the remote IP (the gateway IP if tunnel mode is implemented), the SPI, the sequence number incremented by one and the path MTU.

The sequence number and lifetime fields are then read from the SA database (step 160). A check of both the sequence number and lifetime is then performed (step 162). For the sequence number, it is checked whether an overflow has occurred. A sequence number overflow may be hard or soft. If a hard overflow occurred, the SA is closed (step 164), the packet rejected (step 168) and the status register updated accordingly (step 146). If a soft overflow occurred, the CPU is informed by modifying the soft sequence (SEQ) bit in the lower flags and processing continues with step 120. If no sequence number overflow occurred, control passes to step 120.

For the lifetime, it is checked whether a lifetime overflow has occurred. Note that the main SA processing only checks the lifetime in terms of bytes. A lifetime check in terms of time is performed by the SA management. The size of the received packet is subtracted from the current value of the lifetime and the result checked for overflow. A result of less than zero indicates an overflow. An overflow may be hard or soft. If a hard overflow occurred, the SA is closed (step 164), the packet rejected (step 168) and the status register updated accordingly (step 146). If a soft overflow occurred, the CPU is informed by modifying the soft lifetime (SLT) bit in the lower flags and processing continues with step 120. If no lifetime overflow occurred, control passes to step 120.

If the received packet is an inbound packet (step 110), security association recognition is performed on the packet (step 112), as described in more detail infra. The SA is identified by hashing the SPI, remote IP/gateway IP and the protocol. The results of the recognition are returned to the main SA processor. If no matching SA entry is found during the recognition process, the packet is rejected (such is the case when the SA does not exist yet). If the recognition finds a matching SA, the packet is decrypted. The dynamic filter recognizes the packet as a first packet, opens a new session and connects the session to the SA.

If the IPSec mode failed (step 114), the packet is rejected (step 152) and the status register updated (step 146). If it did not fail, the upper flags are passed to the security engines, e.g., ED, HMAC, and the packet builder (step 116). The packet builder functions to assemble the plaintext version of the packet for forwarding over the LAN.

The data transferred to the ED security engine comprises the IPSec mode, encryption algorithm (e.g., DES, 3DES, etc.), CBC or ECB, padding stream type, class of each DES in the case of 3DES, the encryption key and the encryption/decryption instruction from the header decoder (i.e. whether encryption or decryption is to be performed).

The data transferred to the HMAC security engine comprises the IPSec mode, authentication algorithm (e.g., SHA1, MD5, etc.), authentication header and the authentication key.

If an error is generated by any of the security engines (e.g., from the ED if padding failed or from the HMAC if authentication failed, etc.) the packet is rejected (step 114).

The anti-replay window method is them performed (step 118), described in more detail infra. If the received sequence number is beyond the anti-replay window (ARW), it is updated and shifted to adjust for the received sequence number.

If the SA is AH (step 120), the AH keys are transferred to the authentication security engine (step 148) and control passes to step 140. The SA may be (1) an AH only single SA or (2) an AH SA that is part of an ESP and AH SA bundle. In the latter case, during the first pass through the method, the pointer points to the ESP portion of the bundle and during the second pass is set to the AH portion of the bundle.

If the SA is other than an AH SA, it is checked if the packet is inbound (step 122) and CBC (step 124). If so, the IV is passed to the ED security engine (step 126). If the packet is not inbound or not CBC, the ESP keys are transferred to the ED security engine (step 128).

If the received packet is an ESP/AU packet (ESP with authentication) (step 130), the AH keys are transferred to the authentication security engine (step 148). If not, and the packet is not an ESP (step 132) and is an inbound packet (step 136), the AH SA portion is pointed to for ESP and AH type packets (step 137) and control subsequently passes to step 118. If the packet is outbound, control passes to step 162. If the received packet is not an ESP/AU packet (step 130), is an ESP packet (step 132), an outbound packet (step 134) and a CBC packet (step 138), the encryption IV is stored in the SA database (step 139).

If the packet is an inbound packet (step 134), the ARW is stored in the SA database (step 140), the updated sequence number is stored in the SA database (step 142), the lower flags are updated (step 144) and the status register is updated (step 146). Following the status register update, an interrupt may be raised signaling the completion of the main SA processing to the CPU or other host device.

Security Association Recognition

Figure 5:
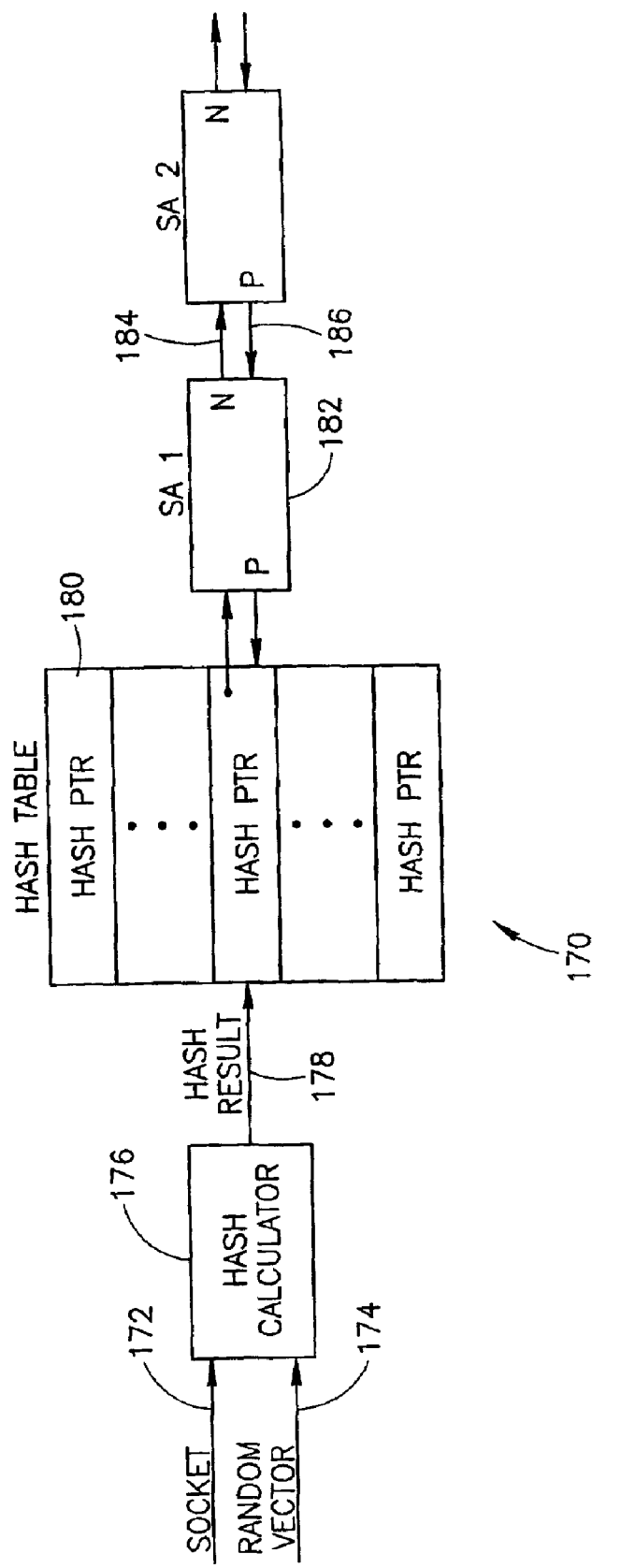
FIG. 5 is a diagram illustrating the hashing technique of determining the SA associated with an input packet.

The SA recognition process will now be described in more detail. A diagram illustrating the hashing technique of determining the SA associated with an input packet is shown in FIG. 5. Each SA corresponds to a unique socket. A SA is identified by comparing the socket of a received packet to the sockets associated with previously opened SAs stored in the SA database. To speed the recognition of a SA, a hash table is used which stores hash pointers to SA records in the SA database and permits rapid lookup of the SA corresponding to a received socket.

New SAs are stored in the SA database and a hash on the socket is calculated, either by the VPN module, SA processor or the CPU. A hash pointer is stored at a location in the hash table 170 (FIG. 5) pointed to by the hash result. If more than one SA is stored at that location, the SA is added to a linked list. Note that initially, each entry in the hash table is initialized to NULL.

Upon receipt of a packet, the socket 172 is input to the hash calculator 176 which functions to generate and output a hash result 178. The hash result is used as the index to the hash table 170 that comprises a plurality of entries 180 each containing a hash pointer. The hash pointer points to a linked list of SAs 182 in the SA database. Each SA record in the database comprises previous 186 and next pointers 184 thus implementing a doubly linked list. If a hit on the socket occurs, each SA in the linked list must be checked until a match with the socket of the received packet is found.

Preferably, the hash function is chosen to produce as even a spread as possible of hash results across the hash table. The hash function may be any suitable function, such as an XOR function or CRC. In one embodiment, performance can be improved over a simple XOR hash function by using a random vector 174 in calculating the hash result in accordance with the following equation.

$$\begin{bmatrix} SOCK_1 \\ SOCK_2 \\ SOCK_3 \\ \vdots \\ SOCK_N \end{bmatrix}_{1 \times N} \otimes \begin{bmatrix} RV_1 & RV_2 & RV_3 & \cdots & RV_N \\ RV_2 & RV_3 & RV_4 & \cdots & RV_{N-1} \\ RV_3 & RV_4 & RV_5 & \cdots & RV_{N-2} \\ \vdots & \vdots & \vdots & \cdots & \vdots \\ RV_R & RV_{R+1} & RV_{R+2} & \cdots & RV_{R+N-1} \end{bmatrix}_{N \times R} = \begin{bmatrix} OUT_1 \\ OUT_2 \\ OUT_3 \\ \vdots \\ OUT_R \end{bmatrix}_{1 \times R} \quad (1)$$

wherein the operator $\otimes$ is defined as follows $$OUT_i = (RV_{i1} \text{ AND } SOCK_1) \oplus (RV_{i2} \text{ AND } SOCK_2) \oplus \ldots \oplus (RV_{1N} \text{ AND } SOCK_N) \quad (2)$$

and $OUT_i$ represents the $i^{th}$ byte of the output matrix;
$SOCK_k$ represents the $k^{th}$ byte of the input matrix;
$RV_{ik}$ represents the i, j byte of the random vector matrix;
$\oplus$ indicates the XOR function;

The input socket data is generated thus generated using the random vector and the input socket data.

Figure 6:
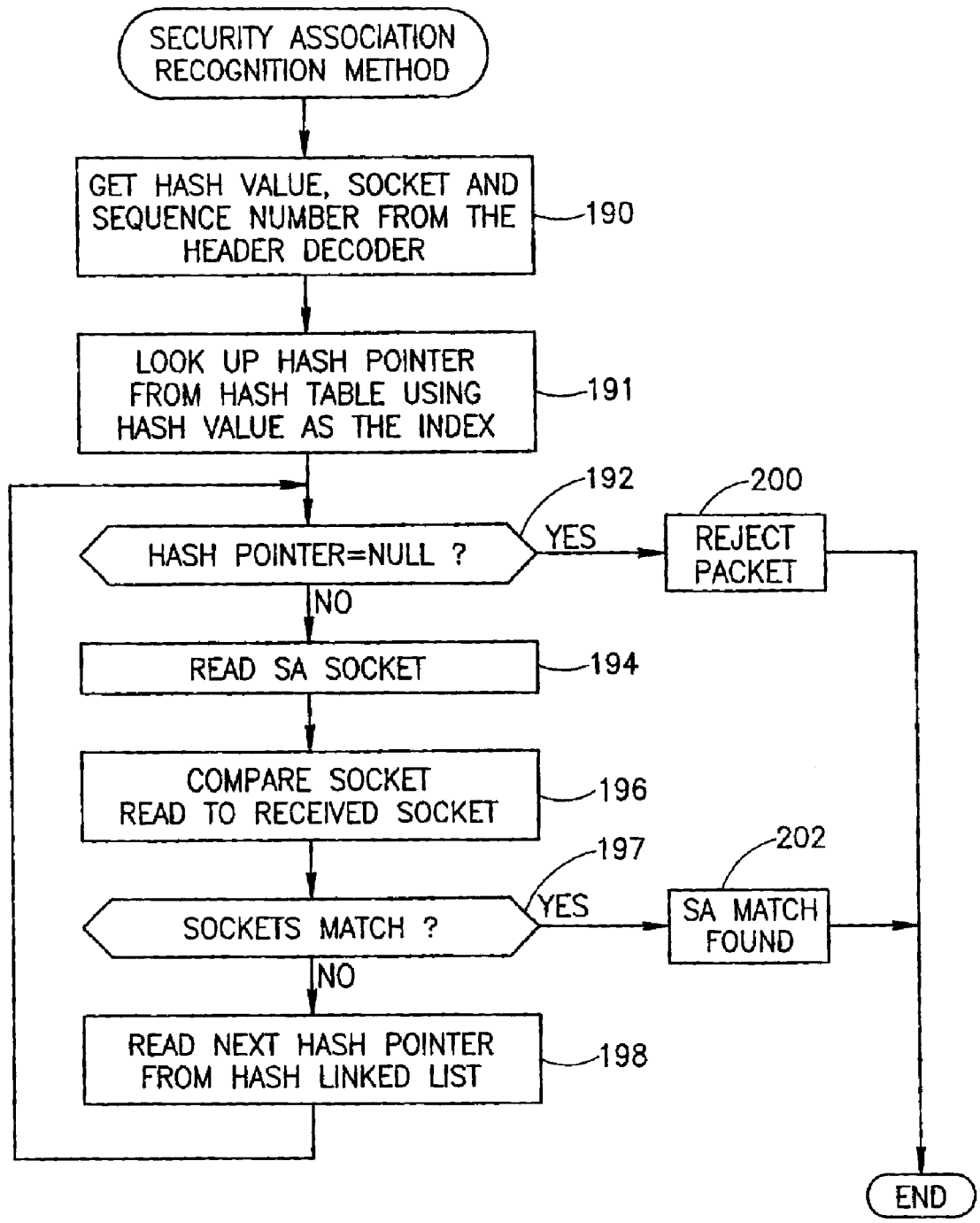
FIG. 6 is a flow diagram illustrating the hashing method of the SA recognition process of the present invention.

A flow diagram illustrating the hashing method of the SA recognition process of the present invention is shown in FIG. 6. The first step is to obtain a hash pointer (typically provided by the header decoder), the socket and sequence number of the received packet from the header decoder (step 190). The hash value is generated by the hash calculator 176. Alternatively, the header decoder or other entity may calculate the hash pointer. A look up on the hash table is performed and the hash pointer is read from the table (step 191). If the hash pointer is equal to NULL, (step 192), the packet is rejected (step 200).

If the hash pointer is not NULL, the hash pointer is used to read the first SA in the linked list associated with the hash pointer and socket corresponding to the SA (step 194). The SA's socket is compared to the socket in the received packet (step 196). If the sockets match (step 197), a SA match is found (step 202) and reported to the main SA process. If the sockets do not match (step 197), the next hash pointer is read from the linked list (step 198) and the method repeats from step 192 until either the last hash pointer points to NULL or a SA match is found.

Note that a full compare on the socket is always performed even in the event only one SA is stored in the linked list. Note also that the scope of the invention is not limited by which entity updates and maintains the linked list, i.e. either the SA processor or the CPU. The depth of the hash table can be any desired value. Typically, however, the depth is set in accordance with the number of SAs to be maintained simultaneously. Preferably, the number of hash entries is one or two times the number of SAs since it is not desirable to have many duplicates due to the time consuming nature of the full socket compare.

Security Association Database

The SA database 86 (FIG. 3) will now be described in more detail. As described supra, the SA database functions to store security related data for a plurality of security associations. The size of the SA database may vary depending on the implementation and the system requirements. The fields making up each record of the database is listed below in Table 1.

TABLE 1

SA database record fields

| Field No. | Field Description | Length (bits) |
| --- | --- | --- |
| 1 | Upper Flags | 16 |
| 2 | Path MTU | 16 |
| 3 | Remote IP Address/Gateway Address | 32 |
| 4 | Security Parameter Index (SPI) | 32 |
| 5 | Next SA bundle pointer | 16 |
| 6 | Previous SA bundle pointer | 16 |
| 7 | Next Hash pointer | 16 |
| 8 | Previous Hash pointer | 16 |
| 9 | Next LRU pointer | 16 |
| 10 | Previous LRU pointer | 16 |
| 11 | Lower Flags | 16 |
| 12 | Last matching session pointer | 16 |
| 13 | Sequence number | 32 |
| 14 | Anti-replay window (127:0) | 128 |
| 15 | Encryption Initial Value (63:0) | 64 |
| 16 | Encryption Key (191:0) | 192 |
| 17 | Authentication Key/Hashed Key Input (159:0) | 160 |
| 18 | Hashed Key Output (159:0) | 160 |
| 19 | Soft/Hard Lifetime | 32 |

Fields 1 and 11 store the upper and lower flags, respectively, which comprise a plurality of status bits described in more detail infra. The path MTU is stored in field 2 and represents the maximum size permitted for a packet including all headers. The remote IP/gateway IP address in field 3 and the SPI in field 4 make up the SA socket along with the security protocol identifier. The next and previous SA pointers (fields 5 and 6) are used to construct a doubly linked list of SAs that are all associated with the same Security Policy Database (SPD). Fields 7 and 8 store the next and previous hash pointers within the hash linked list described supra. The hash linked list is used during SA recognition of a packet. Fields 9 and 10 store next and previous LRU pointers in a LRU linked list used to order SAs in terms of staleness. The LRU linked list operation is described in more detail infra.

A pointer to the last open session with this SA is stored in field 12. The current sequence number for the SA is stored in field 13. Field 14 stores the 128 bit anti-replay window used in the ARW mechanism for rejecting replay packets. Field 15 stores a 64 bit encryption initial value (IV), field 16 stores a 192 bit encryption key and field 17 stores a 160 bit authentication key/hashed key input (HKI). Field 18 stores the 160 hashed key output (HKO) value. Field 19 stores the soft/hard lifetime for the SA which is used to determine when to close a particular SA.

The HKI and HKO values are intermediary results generated during the authentication process. They are both stored in the table to save processing time upon receipt of subsequent packets. Both the HKI and HKO values are calculated from the hash of the authentication key and a predefined pad value. The HKI value is stored in place of the authentication key in the SA database because once it is calculated, the original key is not needed anymore. Alternatively, the authentication key, HKI and HKO values may be stored separately in the database. The SA database receives the HKI and HKO values upon the first use of the SA from the HMAC security engine.

As described above, the SA database comprises upper and lower flags for conveying status related information to and from the CPU. The upper flags status comprises a plurality of bits as shown below in Table 2.

TABLE 2

Upper Flag Bits

| Flag | Definition | Size | Value | Description |
|------|------------|------|-------|-------------|
| IPM | IPSec mode | 4 bits | 0000 | No VPN |
|      |            |        | 0001 | Transport AH |
|      |            |        | 0010 | Tunnel AH |
|      |            |        | 0011 | Transport ESP |
|      |            |        | 0100 | Tunnel ESP |
|      |            |        | 0101 | Transport ESP/AU |
|      |            |        | 0110 | Tunnel ESP/AU |
|      |            |        | 0111 | Transport ESP Transport AH |
|      |            |        | 1000 | Tunnel ESP Transport AH |
|      |            |        | 1001 | Transport ESP null (AU only) |
|      |            |        | 1010 | Tunnel ESP null (AU only) |
|      |            |        | 1011 | Authentication Creation/Check |
|      |            |        | 1100 | Encryption/Decryption |
|      |            |        | 1101 | Encryption/Decryption + Authentication |
| DET | DES type | 1 bit | 0 | DES |
|      |          |       | 1 | 3DES |
| DEM | DES mode | 1 bit | 0 | ECB |
|      |          |       | 1 | CBC |
| PAM | PAD mode | 1 bit | 0 | ESP padding with zeros |
|      |          |       | 1 | ESP padding with incrementing values |
| 3DE | 3DES class | 3 bits | 000 | EEE |
|      |            |        | 001 | EED |
|      |            |        | 010 | EDE |
|      |            |        | 011 | EDD |
|      |            |        | 100 | DEE |
|      |            |        | 101 | DED |
|      |            |        | 110 | DDE |
|      |            |        | 111 | DDD |
| AHT | AH type | 1 bit | 0 | MD5 |
|      |         |       | 1 | SHA1 |
| KEY | $1^{st}$ use of key | 1 bit | 0 | This is the same key |
|      |                    |       | 1 | First use of this key - create HKI and HKO |
| AHS | AH size | 1 bit | 0 | AH size is 96 |
|      |         |       | 1 | AH size is 160 |
| AH  | AH or ESP | 1 bit | 0 | This SA is ESP |
|      |           |       | 1 | This SA is AH |
| DIR | Direction | 1 bit | 0 | SA for outbound packets |
|      |           |       | 1 | SA for inbound packets |
| EMP | Empty | 1 bit | 0 | This SA is used (SA is valid) |
|      |       |       | 1 | This SA is empty (SA is invalid) |

All of the upper flags are set by the CPU and read by the SA processor. The EMP flag can also be set by the SA processor. The SA processor sets this bit to a one when the SA is empty, i.e. invalid. The CPU sets this bit to zero when the SA is valid. The IPM bits indicate the specific IPSec mode, i.e., ESP, ESP/AU, AU only, transport, tunneling, etc. The last three IPSec modes can optionally be used to implement additional security standards, such as Secure Sockets Layer (SSL), to encrypt a certain file, etc. In these modes, the VPN engine is used stand alone without the packet building functionality. Thus, the VPN engine functions as software accelerator implementing DES/3DES encryption/decryption engine mode (IPM=1100), SHA-1/MD-5 authentication engine mode (IPM=1011) or both encryption and authentication engine mode (IPM=1101).

The DET bit indicates the type of DES either DES or 3DES. The DEM bit indicates the DES mode either ECB or CBC. The PAM bit indicates either ESP padding with zeros or incrementing values. The 3DE bit indicates the particular 3DES class. The AHT bit indicates the type of AH authentication either MD5 or SHA1. The AHS bit indicates the size of the AH either 96 or 160 bits, the AH bit indicates the SA is either ESP or AH and the DIR bit indicates whether the SA is for inbound packets.

The SA database also comprises a lower flags status register for conveying status related information to and from the CPU. The lower flags status comprises a plurality of bits as shown below in Table 3.

TABLE 3

Lower Flag Bits

| Flag | Definition | Size | Value | Description |
|------|------------|------|-------|-------------|
| ARW | ARW size | 2 bits | 00 | Anti Replay disabled |
|      |          |        | 01 | Anti Replay Window = 32 |
|      |          |        | 10 | Anti Replay Window = 64 |
|      |          |        | 11 | Anti Replay Window = 128 |
| HSH | $1^{st}$ in HASH | 1 bit | 0 | This is not the $1^{st}$ SA in this HASH entry |
|      |                 |       | 1 | This is the $1^{st}$ SA in this HASH entry |
| HLD | Hold | 1 bit | 0 | |
|      |      |       | 1 | Don't delete this session |
| MAN | manual key | 1 bit | 0 | No manual keying for this SA |
|      |            |       | 1 | Manual keying for this SA |
| SAL | SA lifetime mode | 1 bit | 0 | SA lifetime is measured in seconds |
|      |                  |       | 1 | SA lifetime is measured in 64 bytes units |
| SOH | soft or hard lifetime | 1 bit | 0 | The lifetime in this SA is soft |
|      |                       |       | 1 | The lifetime in this SA is hard |
| SLT | soft lifetime | 1 bit | 0 | |
|      |               |       | 1 | SA lifetime has reached soft overflow |
| SEQ | soft sequence | 1 bit | 0 | |
|      |               |       | 1 | SA sequence has reached soft overflow |

The ARW bits indicate the size of the anti-replay window if it exists. The HLD bit indicates not to delete a particular SA. This flag protects a SA entry from being deleted by the SA processor hardware. The MAN bit indicates whether there is manual keying for the SA. If manual keying is configured, the sequence rolls over when 0xFFFFFFFF is reached since manual keys are not allowed to be deleted by the SA processor. The SAL bit indicates whether the SA lifetime is measured by time or data, i.e. in seconds or 64 bytes units. The SOH bit indicates whether the lifetime is a soft or hard lifetime. The SLT bit indicates that soft overflow has occurred in the soft lifetime. The SEQ bit indicates that soft overflow has occurred in the SA sequence. Note that the ARW, HLD, MAN, SAL and SOH flags are set by the CPU and read by the SA processor. The SLT and SEQ flags are set by the SA processor and read by the CPU. Unless the HLD or MAN flag is set, the SA is deleted upon sequence overflow (0xFFFFFFFF).

Anti-Replay Window Mechanism

Figure 7:
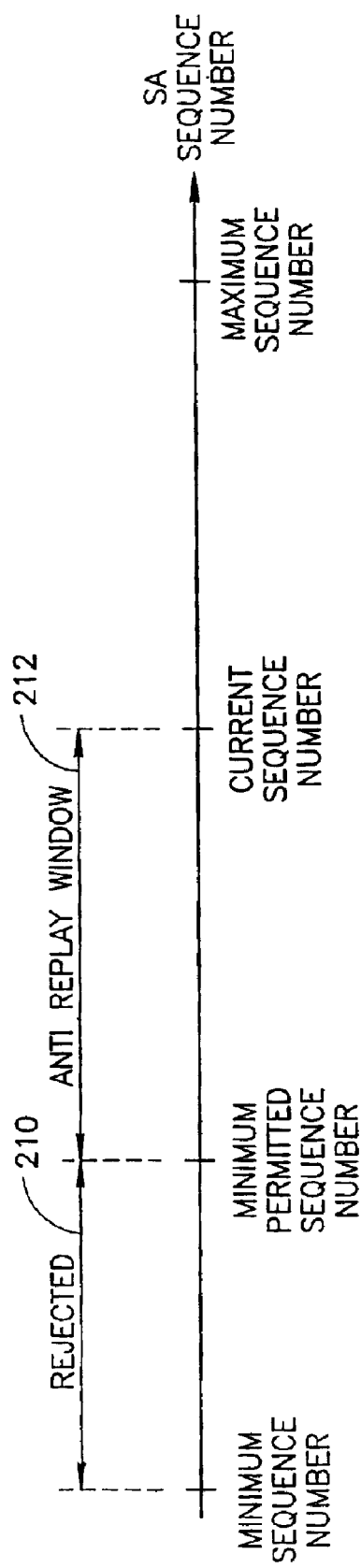
FIG. 7 is a diagram illustrating the anti-replay window mechanism performed during checking by the main SA processor.

In accordance with the invention, the main SA processing is adapted to implement an anti-replay mechanism whereby replay packets are rejected. The mechanism functions to track the sequence numbers in the packet and to reject packets whose sequence number is less than the minimum permitted. A diagram illustrating the anti-replay window mechanism performed during checking by the main SA processor is shown in FIG. 7.

The x-axis represents the SA sequence number with the minimum sequence number being 0x 00000000 and the maximum sequence number being 0xFFFFFFFF. A window is created, referred to as an anti-replay window (ARW) (segment 212) that represents permitted sequence numbers. Packets received whose sequence numbers are below the window are rejected (segment 210). In addition, only one packet is allowed per sequence number. Thus, the ARW comprises a bit for each sequence number that falls within it. As packets are received, the corresponding sequence number bits are set. A packet received with a sequence number whose bit is already set is rejected.

Figure 8:
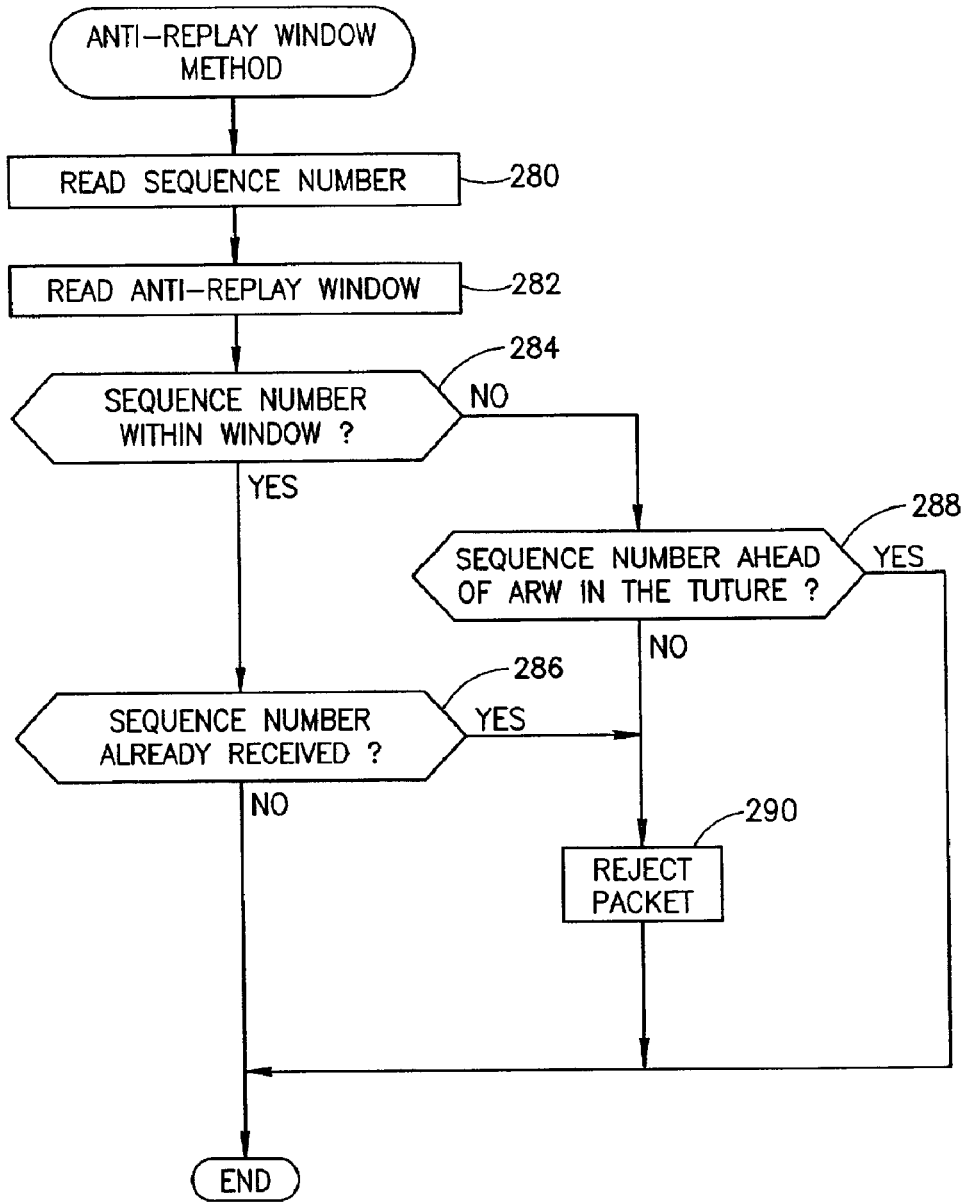
FIG. 8 is a flow diagram illustrating the anti-replay window method of the present invention.

A flow diagram illustrating the anti-replay window method of the present invention is shown in FIG. 8. The sequence number is first read from the received packet (step 280). The current position of the anti-replay window is retrieved from the SA database (step 282). If the sequence number is within the window (step 284), it is then checked whether a packet with that sequence number has already been received (step 286). If so, the packet is rejected (step 290). If not, the ARW mechanism allows the packet.

If the sequence number in the received packet is outside the window (step 284), it is checked whether it is below or higher than the ARW (step 288). If it lower than the window, the packet is rejected. If it is higher, the packet is allowed and the ARW is adjusted up to the new sequence number, i.e. shifted to the right.

SA Management Module

In accordance with the invention, the SA management module is operative to maintain a doubly linked list for storing the SAs in least recently used order. The SA management module performs several functions relating to maintenance and control of the SA database. The SA management module functions to check the validity of SA entries (i.e. lifetimes) of SAs in the SA database upon command from the CPU. When the command to check lifetimes is received, the lifetime fields of each record in the SA database are examined. Soft lifetime overflows are reported to the CPU and in the case of a hard lifetime overflow, the corresponding SA is deleted. Lifetime checking is performed on the SAs in order to flush SAs that have become stale and that were not normally closed for some reason. For example, a SA may age out if it corresponds to a packet that violated a security rule.

When a SA is deleted, the SA management module functions to maintain and update SA bundles by maintaining the LRU and hash pointer relationships and inform the dynamic filter module which corresponding session should be closed in order to insure that sessions that utilize this SA will be closed.

The SA management module also functions to provide unused (i.e. empty and available) SAs to the CPU upon request. In operation, the CPU requests one or more new SAs and the SA management module searches and returns the one or more indexes to the CPU. SAs are obtained from the LRU list by disconnecting the least recently used SA bundle (i.e. SAs for both transmit and receive directions) and all the associated connected sessions. Similarly, the SA management module also gracefully disconnects SAs that are no longer in use. The SA management module also opens new SAs wherein LRU pointers and hash pointers in the hash table and SA database are updated.

Figure 9:
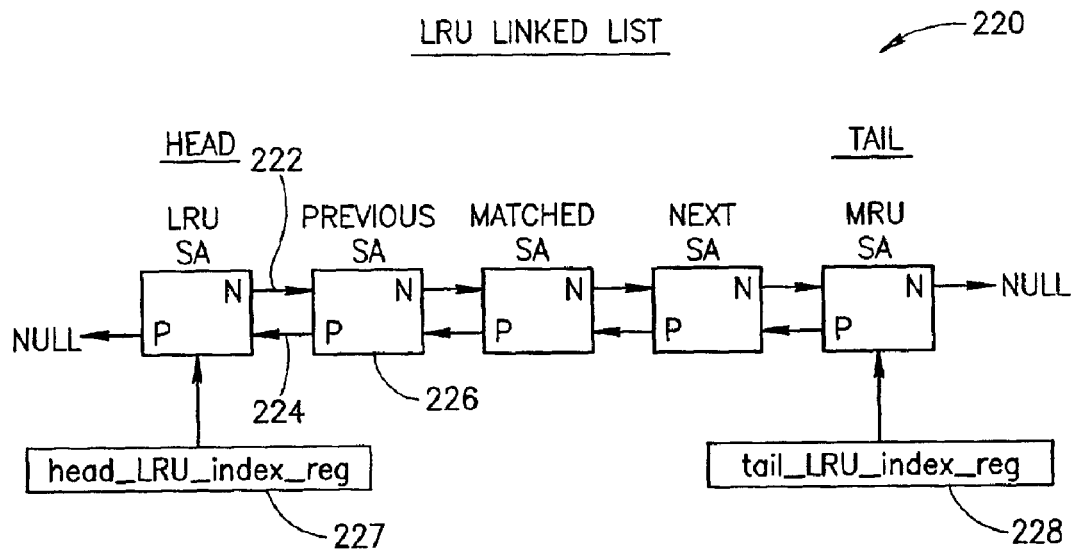
FIG. 9 is a diagram illustrating the least recently used link list structure used to track the SA staleness.

A diagram illustrating the least recently used (LRU) link list structure used to track SA use is shown in FIG. 9. Security association entries are entered into the SA database via the CPU when a SA is opened. The CPU requests a SA index from the SA management module. The next and previous SA bundle pointers are used to connect SAs that relate to each other. To insert a SA into the database, the index of the leading SA is used to insert the new SA into the LRU. In addition, the CPU calculates a hash value for the socket of the new SA and writes it into a register marking its hash value.

Note that in the example embodiment presented herein, the host or external CPU configures the security related parameters of the SAs, e.g., key assignment, length of HMAC, padding, etc., during the IKE process. The actual insertion of the SA is performed by the SA management upon command of the CPU or host.

Every time a SA is recognized (i.e. accessed), and the corresponding packet is not rejected by the SA processor, the SA is placed at the tail of the LRU linked list which represents the most recently used SA. The doubly linked list, generally referenced 220, comprises a plurality of SAs 226 each having a next pointer 222 and a previous pointer 224. The SA at the tail of the LRU linked list is pointed to by the contents of a tail_LRU_index_reg register 228. The SA pointed to by this register represents the most recently used SA. The SA at the head of the LRU linked list is pointed to by the contents of a head_LRU_index_reg register 227.

The LRU linked list is used to determine, in the event the SA database is full, which SA to remove when a new SA is added. In this case, the least recently used SA is closed and the space is used to store the new SA.

Figure 10:
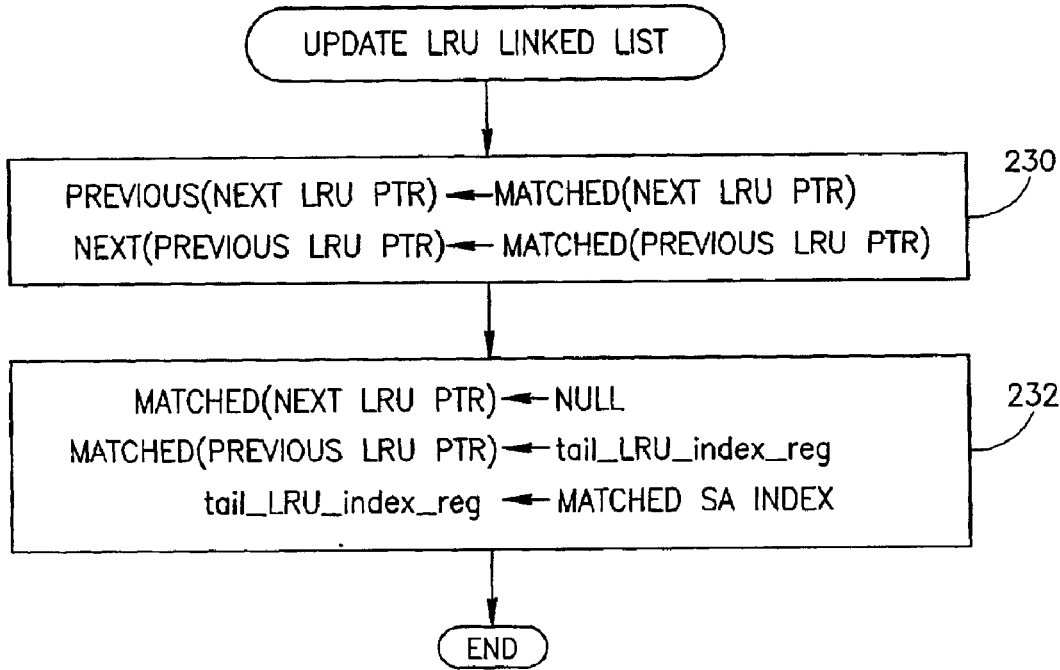
FIG. 10 is a flow diagram illustrating the method of updating the LRU linked list upon recognition of a SA associated with an input packet.

A flow diagram illustrating the method of updating the LRU linked list upon recognition of a SA associated with an input packet is shown in FIG. 10. The update method is performed every time a matching SA is accessed and the corresponding packet is allowed. With reference to FIG. 9, in particular to the SAs labeled Previous SA, Matched SA and Next SA, the matched SA is moved from its location in the list to the tail to become the most recently used SA. The matched SA is removed by (1) setting the next LRU pointer of the Previous SA to the next LRU pointer of the Matched SA and (2) setting the previous LRU pointer of the Next SA to the previous LRU pointer of the Matched SA (step 230).

The Matched SA is then made the most recently used by (1) setting the next LRU pointer of the Matched SA to NULL, (2) setting the previous LRU pointer of the Matched SA to the contents of the tail_LRU_index_reg register and (3) setting the tail_LRU_index_reg register to the index of the Matched SA (step 232).

Figure 11:
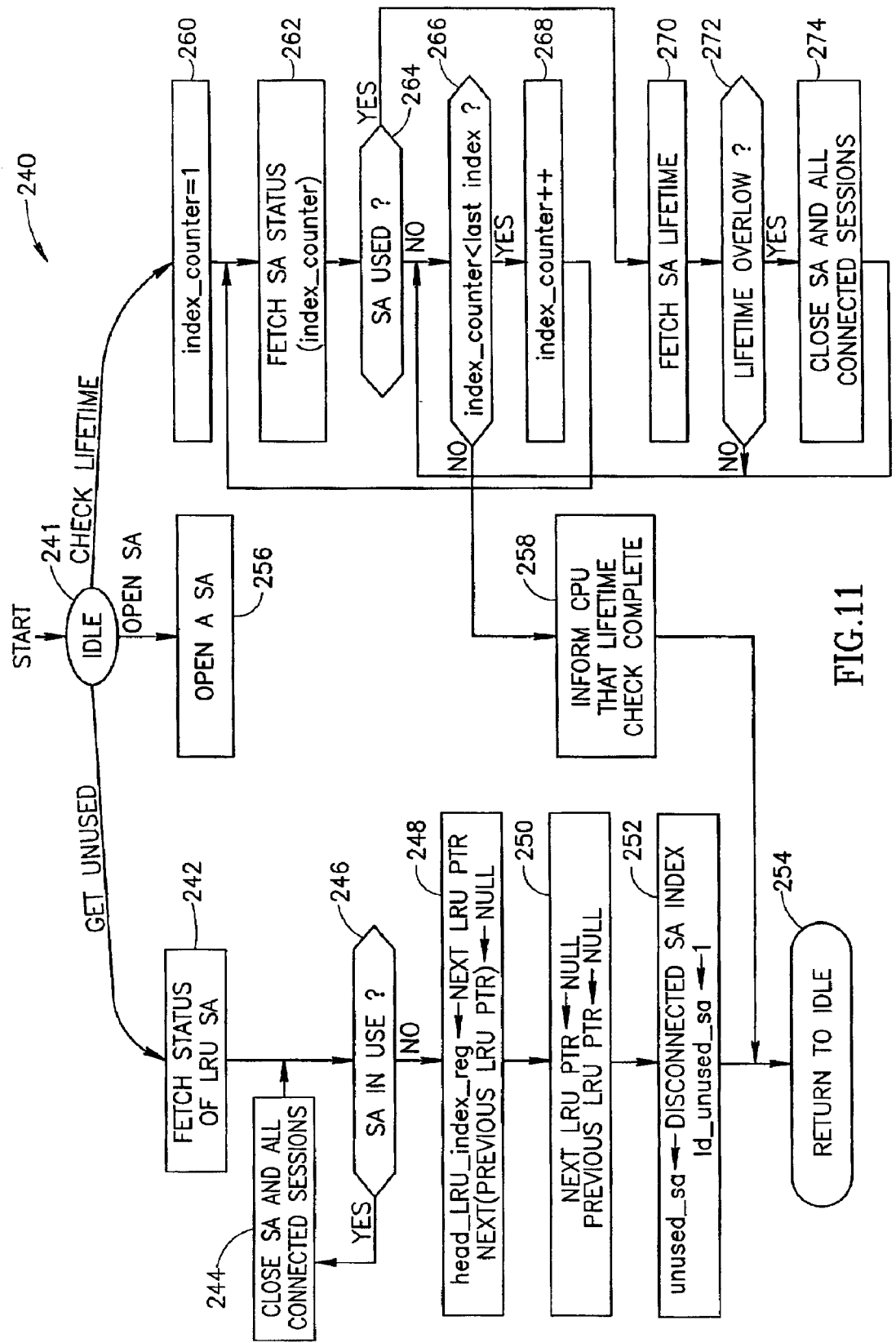
FIG. 11 is a flow diagram illustrating the processing of the SA management module of the present invention.

A flow diagram illustrating the processing of the SA management module of the present invention is shown in FIG. 11. The SA management processing begins in the idle step 241 and moves to the next step depending on the event. In the case of a 'get unused' instruction from the CPU, the status of the least recently used SA is fetched (step 242). If the SA is in use (step 246), the SA and all related connected sessions are closed (step 244). If the SA is not in use, the head_LRU_index_reg is set to the next LRU pointer of the least recently used SA and the next(previous LRU pointer) is set to NULL (step 248). The next and previous LRU pointers of the SA removed are then set to NULL, thereby removing the least recently used SA from the LRU linked list (step 250). The unused_sa variable is set to the SA just disconnected and the flag to inform the CPU accordingly is set to '1' (step 252). The process then returns to Idle (step 254).

A 'check lifetime' command from the CPU causes the SA manager to begin checking lifetimes of all the active SAs.

The index_counter is incremented (step 260) and the status of a SA is fetched (i.e. the index_counter) (step 262). If the SA is currently in use (step 264), the SA lifetime is fetched from the SA database (step 372). If the lifetime has overflowed, either measured by time or number of bytes (i.e. the SA has aged out) (step 272), the SA and all related connected sessions are closed (step 274).

If the SA is not used or if the SA has not aged out, it is checked whether the index_counter is less than the last index (step 266). If it is, the index_counter is incremented (step 268) and the method continues with step 262. If it is not, the CPU is notified via the main SA processing module that the lifetime check is complete (step 258) and the method returns to Idle (step 254).

Figure 12:
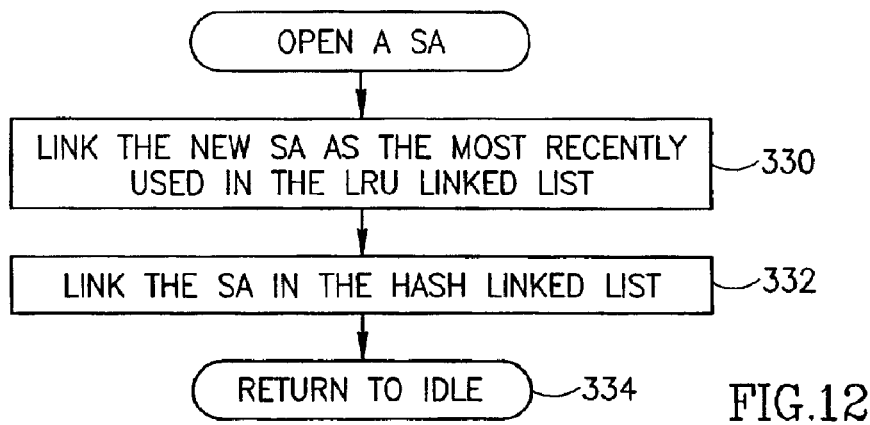
FIG. 12 is a flow diagram illustrating the processing performed by the SA management module of the present invention to open a SA.

A flow diagram illustrating the processing performed by the SA management module of the present invention to open a SA is shown in FIG. 12. When a SA is opened, it is placed at the tail of the LRU linked list (step 330). The SA is also placed in the appropriate place in the hash linked list (step 332). The method then returns to the Idle state (step 334).

Figure 13:
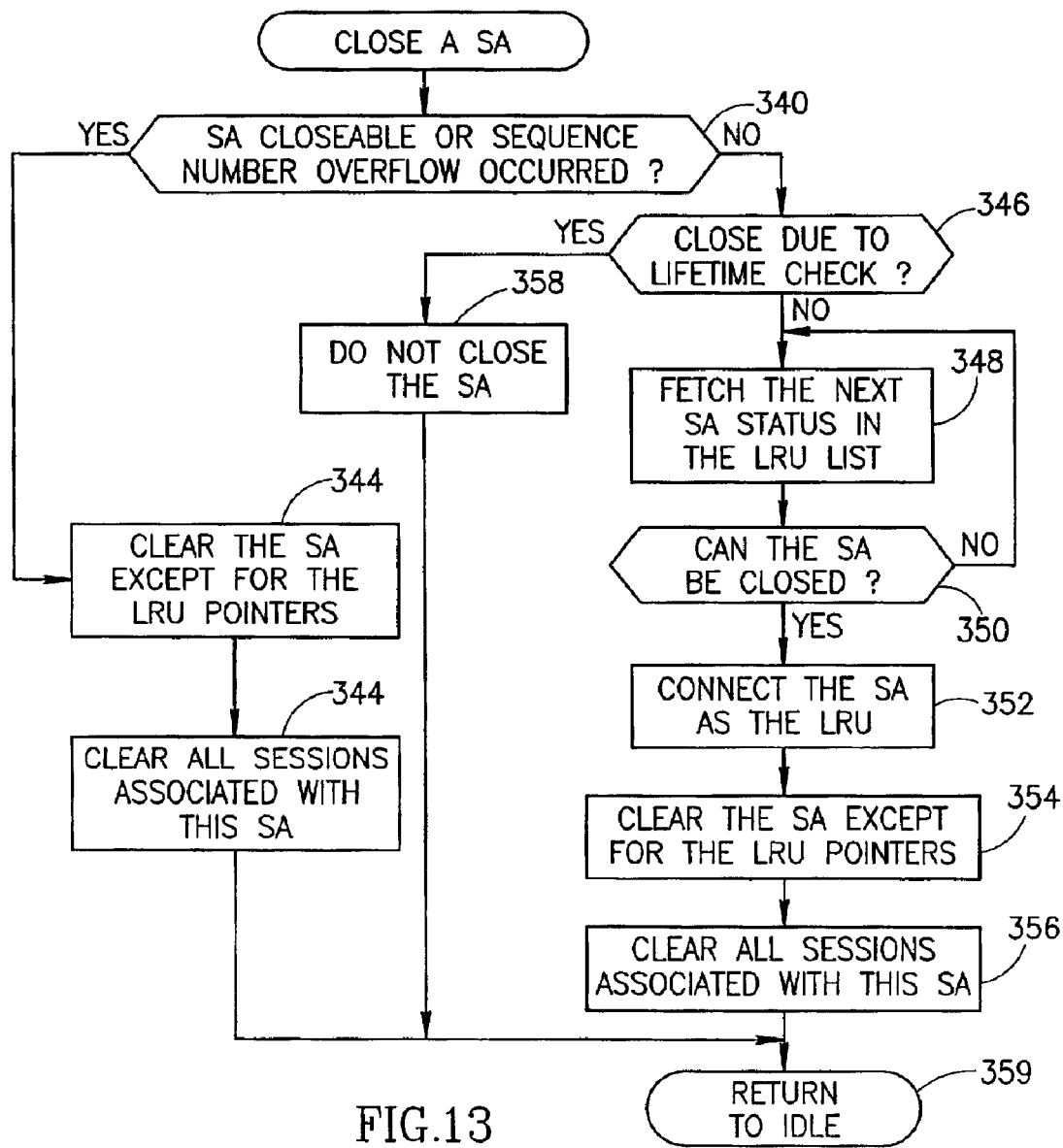
FIG. 13 is a flow diagram illustrating the processing performed by the SA management module of the present invention to close a SA.

A flow diagram illustrating the processing performed by the SA management module of the present invention to close a SA is shown in FIG. 13. If the SA is closable or the sequence number overflow has occurred (step 340), the SA is cleared without modification of the LRU pointers (step 342). All the sessions associated with this SA are then closed (step 344). The method then returns to the Idle state (step 359).

If the SA cannot be closed and no sequence number overflow occurred (step 340), and the request to close was due to a lifetime check (step 346), the SA is not closed (step 358) and the method returns to the Idle state (step 359). If the close request was not due to a lifetime check, the next SA status pointed to by the least recently used list is fetched (step 348). If this SA cannot be closed (step 350), the method continues with step 348 and the process repeats until a SA is found that can be closed. If a SA that can be closed is found, the SA is configured as the LRU (step 352). The SA is then cleared except for the LRU pointers (step 354), all sessions associated with this SA are cleared (step 356) and the method returns to the Idle state (step 359).

Figure 14:
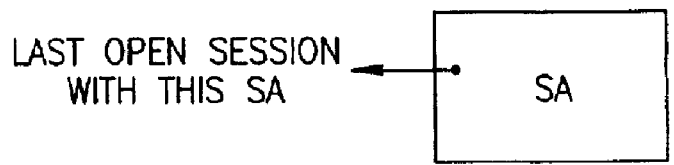
FIG. 14 is a diagram illustrating the last open session pointer associated with each SA record.

As stated above, the SA management module also functions to maintain a pointer in the SA database that points to the last open session used on the SA. A diagram illustrating the last open session pointer associated with each SA record is shown in FIG. 14. Each SA entry may comprises a pointer that points to a different last open session. This pointer is updated each time a session is opened. Note that the last open session always is at the head of the related session list.

Figure 15:
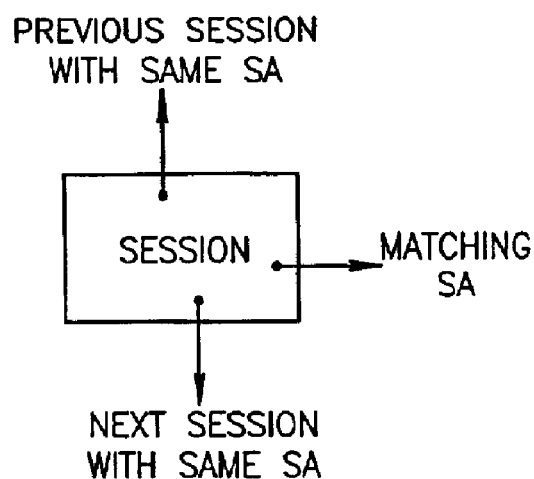
FIG. 15 is a diagram illustrating the previous and next session pointers and matching SA pointer that are associated with each session record.

The session database in the dynamic filter is adapted to store several pointers including LRU, hash, family and SA pointers. The SA pointer functions to point to the SA that this session uses. A diagram illustrating the previous and next session pointers and matching SA pointer that are associated with each session record is shown in FIG. 15. The session record in the session database comprises a pointer to the matching SA to be used for that session and previous and next family pointers to sessions that use the same SA. The next and previous pointers in the session entries are used when a SA is closed and all the sessions related to the SA are to be closed as well. The last open pointer in the SA entry is used to point to the list of one or more sessions that use that SA. When the SA is closed, the related sessions must also be closed. Note that when a SA is closed, both the transmit and receive SAs are deleted and all the connected sessions are also deleted unless they are part of a family. In this case, they are marked as candidates to be killed (i.e. the PSV bit in the session database flags is set).

Figure 16:
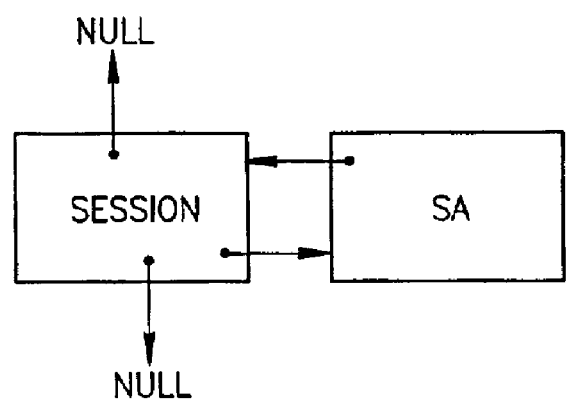
FIG. 16 is a diagram illustrating an example relationship between a single session and single SA record.

A diagram illustrating an example relationship between a single session and single SA record is shown in FIG. 16. In this example, only one session entry uses the SA. The previous and next pointers thus point to NULL. The SA entry comprises a pointer to the last open session for that SA.

Figure 17:
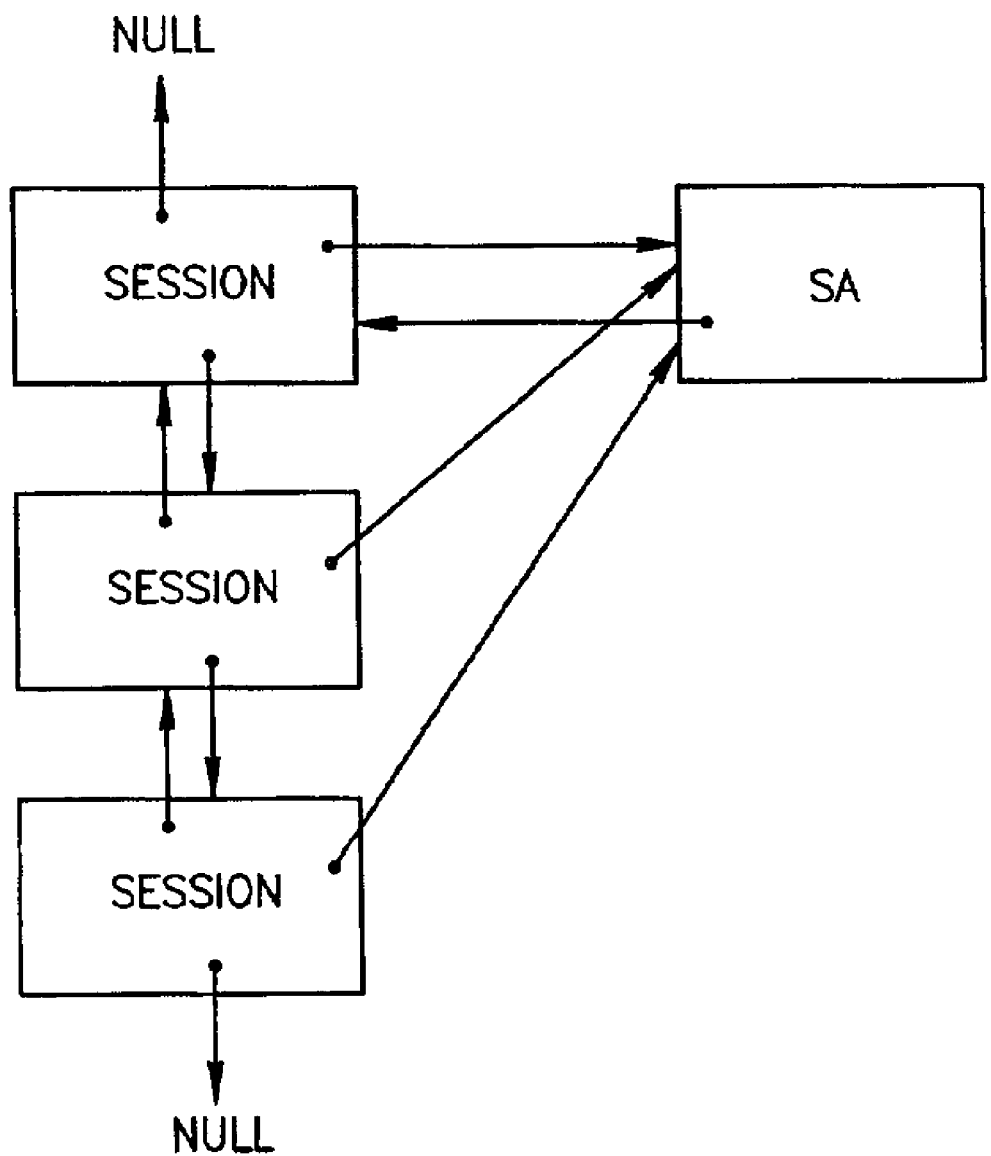
FIG. 17 is a diagram illustrating an example relationship between multiple sessions and a single SA record.

A diagram illustrating an example relationship between multiple sessions and a single SA record is shown in FIG. 17. In this example, three sessions use the same SA. Thus, the matching SA pointers of all three sessions point to the same SA. The next and previous pointers of each session are configured to form a doubly linked list that includes the three sessions. The linked list logically connects the sessions that use the same SA. The SA entry comprises a pointer to the last open session for that SA which points to the head of the linked list.

Computer Embodiment

Figure 18:
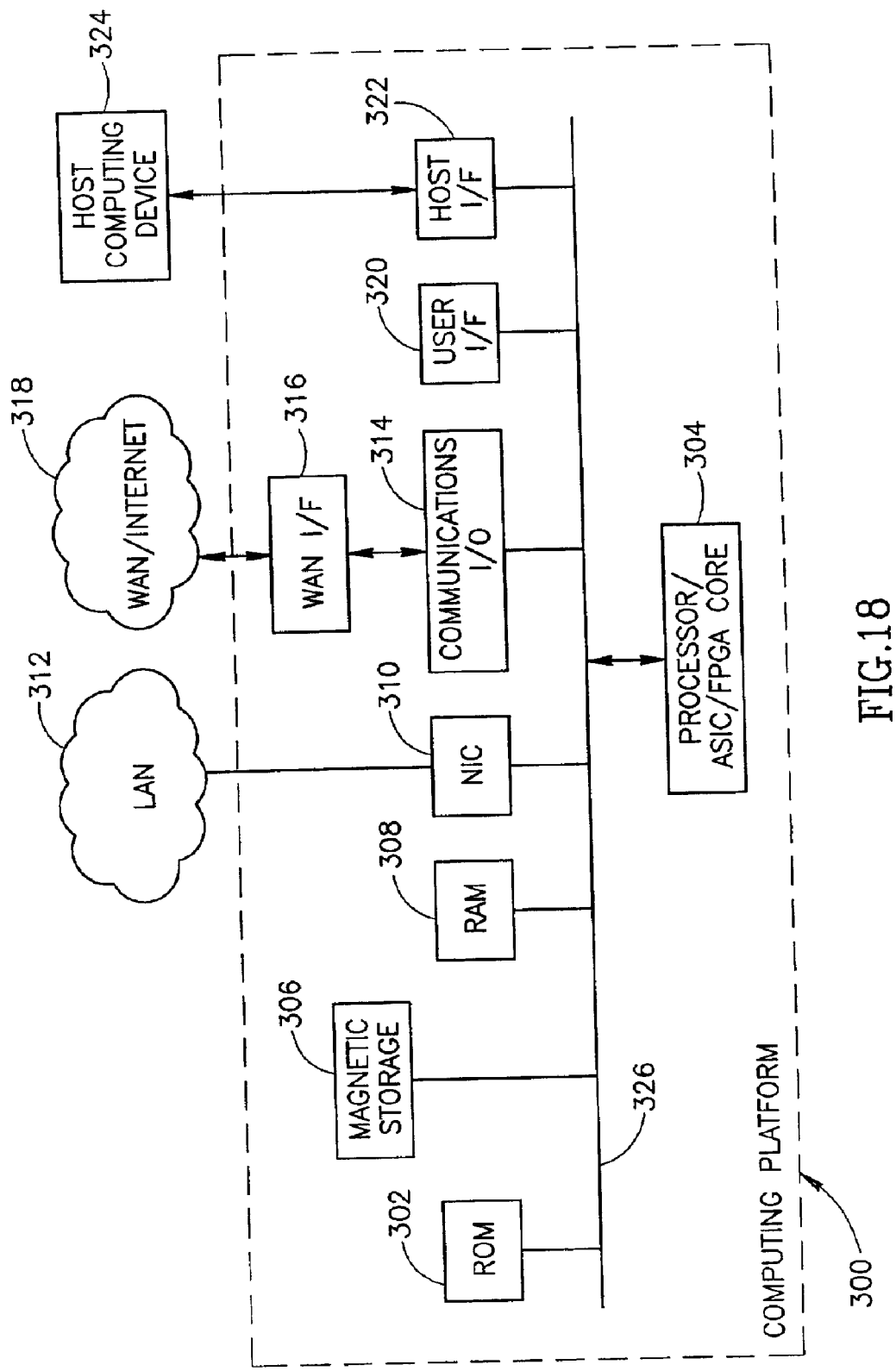
FIG. 18 is a block diagram illustrating an example computer processing system to platform adapted to perform the VPN mechanism and related security association processing of the present invention.

In another embodiment, a computer is operative to execute software adapted to perform the VPN mechanism of the present invention or any portion thereof such as the security association processor. A block diagram illustrating an example computer processing system to platform adapted to perform the VPN mechanism of the present invention is shown FIG. 18. The system may be incorporated within a communications device such as a PDA, cellular telephone, cable modem, broadband modem, laptop, PC, network transmission or switching equipment, network device or any other wired or wireless communications device. The device may be constructed using any combination of hardware and/or software.

The computer system, generally referenced 300, comprises a processor 304 which may be implemented as a microcontroller, microprocessor, microcomputer, ASIC core, FPGA core, central processing unit (CPU) or digital signal processor (DSP). The system further comprises static read only memory (ROM) 302 and dynamic main memory (e.g., RAM) 308 all in communication with the processor. The processor is also in communication, via a bus 326, with a number of peripheral devices that are also included in the computer system.

The device is connected to a WAN 318 such as the Internet via a WAN interface 316. Alternatively, the network 318 may comprise an Optical Ethernet based MAN or other type of MAN depending on the location. The interface comprises wired and/or wireless interfaces to one or more WAN communication channels. Communications I/O processing 314 transfers data between the WAN interface and the processor. The computer system is also connected to a LAN 312 via a Network Interface Card (NIC) 310 adapted to handle the particular network protocol being used, e.g., one of the varieties of copper or optical Ethernet, Token Ring, etc. In operation, the computer system is operative to dynamically filter inbound packets from the WAN to the LAN and outbound packets from the LAN to the WAN as described supra.

An optional user interface 320 responds to user inputs and provides feedback and other status information. A host interface 322 connects a host computing device 324 to the system. The host is adapted to configure, control and maintain the operation of the system. The system also comprises magnetic storage device 306 for storing application programs and data. The system comprises computer readable storage medium which may include any suitable memory means including but not limited to magnetic storage, optical storage, CD-ROM drive, ZIP drive, DVD drive, DAT cassette, semiconductor volatile or non-volatile memory, biological memory devices, or any other memory storage device.

Software operative to implement the functionality of the VPN mechanism of the present invention or any portion thereof such as the security association processor is adapted to reside on a computer readable medium, such as a magnetic disk within a disk drive unit or any other volatile or nonvolatile memory. Alternatively, the computer readable medium may comprise a floppy disk, Flash memory card, EPROM, EEROM, EEPROM based memory, bubble memory storage, ROM storage, etc. The software adapted to perform the VPN mechanism of the present invention or any portion thereof such as the security association processor may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A security association processor circuit, comprising:
a security association database for storing security related data for a plurality of security associations, each entry comprising security association related data corresponding to a unique socket;
means for opening a new security association upon receipt of a socket not found in said security association database;
means for searching for and recognizing a security association associated with a packet in accordance with its socket;
means for retrieving from said security association database a plurality of security related parameters; and
means for forwarding said plurality of security related parameters to a Virtual Private Networking (VPN) security processor for performing one or more security processes therewith.

2. The circuit according to claim 1, further comprising means for updating the contents of said security association database in accordance with results of said security processes.

3. The circuit according to claim 1, wherein parameters associated with said security association are configured by an entity external to said circuit and wherein said circuit comprises means for storing in said security association database security related data corresponding to said new security association in said security association database and a hash value calculated on the socket associated with said new security association.

4. The circuit according to claim 1, wherein said security association is opened by an entity external to said circuit and wherein said circuit comprises means for inserting a pointer to said new security association in a Least Recently Used (LRU) linked list.

5. The circuit according to claim 1, further comprising means for removing unused security associations from said security association database.

6. The circuit according to claim 1, further comprising means for removing unused security associations from said security association database upon exceeding a maximum timeout.

7. The circuit according to claim 1, further comprising means for removing unused security associations from said security association database upon exceeding a maximum byte count.

8. The circuit according to claim 1, wherein said means for searching for and recognizing a security association comprises:
means for calculating a hash value on the socket associated with the security association to be recognized;
means for looking up a hash pointer in a hash table using hash result as an index;
means for retrieving data from said security association database in accordance with said hash pointer; and
means for recognizing said security association if the retrieved data matches the socket associated with the packet.

9. The circuit according to claim 1, wherein said VPN security processor comprises means for performing encryption.

10. The circuit according to claim 1, wherein said VPN security processor comprises means for performing decryption.

11. The circuit according to claim 1, wherein said VPN security processor comprises means for performing authentication.

12. The circuit according to claim 1, wherein said VPN security processor comprises means for performing an IPSec specified service.

13. The circuit according to claim 1, further comprising means for applying an anti-replay mechanism to inbound packets.

14. The circuit according to claim 1, further comprising means for tracking sequence number of inbound packets.

15. The circuit according to claim 1, further comprising means for establishing and maintaining a least recently used (LRU) doubly linked list having a head and tail wherein most recently used security associations are stored at the tail and least recently used security associations are stored at the head.

16. The circuit according to claim 15, wherein in the event said LRU list is full, the security associations at the head is deleted and a new security association is added to the tail.

17. The circuit according to claim 1, wherein said socket comprises a Security Parameter Index (SPI), remote IP and Protocol components.

18. The circuit according to claim 1, wherein said security association related data comprises any one or combination of the following values: IPSec mode, encryption algorithm, encryption key.

19. The circuit according to claim 1, wherein said security association related data comprises any one or combination of the following values: IPSec mode, authentication algorithm, authentication key.

20. The circuit according to claim 1, further comprising means for rejecting said packet if an error is received from said VPN security processor.

21. The circuit according to claim 1, wherein said circuit is implemented in an Application Specific Integrated Circuit (ASIC).

22. The circuit according to claim 1, wherein said circuit is implemented in a Field Programmable Gate Array (FPGA).

23. The circuit according to claim 1, wherein said circuit is implemented in a Digital Signal Processor (DSP).

24. A Virtual Private Network (VPN) circuit, comprising:
security association database means for storing security related data for a plurality of security associations, each entry comprising security association related data corresponding to a unique socket;
a plurality of security engines, each security engine adapted to perform a security process;
means for opening a new security association upon receipt of a socket not found in said security association database means;
means for searching for and recognizing a security association associated with an input packet in accordance with its socket;
means for retrieving from said security association database means a plurality of security related parameters;
means for forwarding said plurality of security related parameters to at least one of said security engines for performing a security process therewith; and
packet building means adapted to construct an output packet in accordance with a particular security mode utilizing said input packet and the results of said security process.

25. The circuit according to claim 24, wherein at least one of said security engines is adapted to implement IPSec tunnel mode services.

26. The circuit according to claim 24, wherein at least one of said security engines is adapted to implement IPSec transport mode services.

27. The circuit according to claim 24, wherein at least one said security engine is adapted to perform encryption.

28. The circuit according to claim 24, wherein at least one said security engine is adapted to perform decryption.

29. The circuit according to claim 24, wherein at least one said security engine is adapted to perform one or more IPSec services.

30. The circuit according to claim 24, wherein said circuit is implemented in an Application Specific Integrated Circuit (ASIC).

31. The circuit according to claim 24, wherein said circuit is implemented in a Field Programmable Gate Array (FPGA).

32. The circuit according to claim 24, wherein said circuit is implemented in a Digital Signal Processor (DSP).

33. A portable computing device, comprising:
communication means adapted to connect said device to a communications network;
memory means comprising volatile and non-volatile memory, said non-volatile memory adapted to store program code;
a processor coupled to said memory means and said communication means for executing said program code; and
a Virtual Private Network (VPN) circuit, comprising:
  security association database means for storing security related data for a plurality of security associations, each entry comprising security association related data corresponding to a unique socket;
  a plurality of security engines, each security engine adapted to perform a security process;
  means for opening a new security association upon receipt of a socket not found in said security association database means;
  means for searching for and recognizing a security association associated with an input packet in accordance with its socket;
  means for retrieving from said security association database means a plurality of security related parameters;
  means for forwarding said plurality of security related parameters to at least one of said security engines for performing a security process therewith;
  packet building means adapted to construct an output packet in accordance with a particular security mode utilizing said input packet and the results of said security process.

34. The device according to claim 33, wherein said communications network comprises a Wide Area Network (WAN).

35. The device according to claim 33, wherein said communications network comprises a Local Area Network (LAN).

36. The device according to claim 33, wherein said communications network comprises the Internet.

37. The device according to claim 33, wherein said communications network comprises a Public Switched Telephone Network (PSTN).

38. The circuit according to claim 33, wherein at least one of said security engines is adapted to perform encryption.

39. The circuit according to claim 33, wherein at least one of said security engines is adapted to perform decryption.

40. The circuit according to claim 33, wherein at least one of said security engines is adapted to perform authentication.

41. The circuit according to claim 33, wherein at least one of said security engines is adapted to perform an IPSec service.

42. The circuit according to claim 33, wherein said VPN circuit is implemented in an Application Specific Integrated Circuit (ASIC).

43. The circuit according to claim 33, wherein said VPN circuit is implemented in a Field Programmable Gate Array (FPGA).

44. The circuit according to claim 33, wherein said VPN circuit is implemented in a Digital Signal Processor (DSP).

45. A security association processor circuit, comprising:
a security association database for storing security related data for a plurality of security associations, each entry comprising security association related data corresponding to a unique socket;
a management unit adapted to open a new security association upon receipt of a socket not found in said security association database;
a recognition unit adapted to search for and recognize a security association associated with an input packet in accordance with its socket;
a main processor unit adapted to retrieve from said security association database a plurality of security related parameters and forward them to a Virtual Private Networking (VPN) security processor for performing one or more security processes therewith; and
a hash unit comprising a hash function and associated hash table for facilitating the search for stored security associations.

46. The circuit according to claim 45, further comprising a least recently used (LRU) linked list adapted to provide a listing of the frequency of use of said security associations stored in said security association database.

47. The circuit according to claim 45, further comprising a packet builder adapted to construct an output packet in accordance with a particular security mode utilizing said input packet and the results of said one or more security processes.

48. The circuit according to claim 45, wherein said VPN security processor comprises means for performing encryption.

49. The circuit according to claim 45, wherein said VPN security processor comprises means for performing decryption.

50. The circuit according to claim 45, wherein said VPN security processor comprises means for performing authentication.

51. The circuit according to claim 45, wherein said VPN security processor comprises means for performing an IPSec service.

52. The circuit according to claim 45, wherein said circuit is implemented in an Application Specific Integrated Circuit (ASIC).

53. The method according to claim 45, wherein said circuit is implemented in a Field Programmable Gate Array (FPGA).

54. The method according to claim 45, wherein said circuit is implemented in a Digital Signal Processor (DSP).

55. A method of security association, said method comprising the steps of:
  establishing a security association database adapted to store security related data for a plurality of security associations, each entry within said security association database corresponding to a socket;
  opening a new security association upon receipt of a socket not found in said security association database;
  searching for and recognizing a security association associated with a packet in accordance with its socket;
  retrieving from said security association database a plurality of security related parameters; and
  forwarding said plurality of security related parameters to a Virtual Private Networking (VPN) security processor for performing one or more security processes therewith.

56. The method according to claim 55, further comprising the step of updating the contents of said security association database in accordance with results of said security processes.

57. The method according to claim 55, wherein said step of opening a new security association comprises:
  storing security related data corresponding to said new security association in said security association database;
  calculating a hash value on the socket associated with said new security association; and
  storing said hash value in a hash table.

58. The method according to claim 55, wherein said step of opening a new security association comprises inserting a pointer to said new security association in a Least Recently Used (LRU) linked list.

59. The method according to claim 55, further comprising the step of removing unused security associations from said security association database.

60. The method according to claim 55, further comprising the step of removing unused security associations from said security association database upon exceeding a maximum timeout.

61. The method according to claim 55, further comprising the step of removing unused security associations from said security association database upon exceeding a maximum byte count.

62. The method according to claim 55, wherein said step of searching for and recognizing a security association comprises the steps of:
  calculating a hash value on the socket associated with the security association to be recognized;
  looking up a hash pointer in a hash table using hash result as an index;
  retrieving data from said security association database in accordance with said hash pointer; and
  recognizing said security association if the retrieved data matches the socket associated with the packet.

63. The method according to claim 55, wherein said VPN security processor is adapted to perform encryption.

64. The method according to claim 55, wherein said VPN security processor is adapted to perform decryption.

65. The method according to claim 55, wherein said VPN security processor is adapted to perform authentication.

66. The method according to claim 55, wherein said VPN security processor is adapted to perform an IPSec specified service.

67. The method according to claim 55, further comprising the step of applying an anti-replay mechanism to packets received from a remote network.

68. The method according to claim 55, further comprising the step of tracking sequence numbers of packets received from a remote network.

69. The method according to claim 55, further comprising the step of establishing and maintaining a least recently used (LRU) doubly linked list having a head and tail wherein most recently used security associations are stored at the tail and least recently used security associations are stored at the head.

70. The method according to claim 69, wherein in the event said LRU list is full, the security associations at the head is deleted and a new security association is added to the tail.

71. The method according to claim 55, wherein said socket comprises a Security Parameter Index (SPI), remote IP and Protocol components.

72. The method according to claim 55, wherein said security association related data comprises any one or combination of the following values: IPSec mode, encryption algorithm, encryption key.

73. The method according to claim 55, wherein said security association related data comprises any one or combination of the following values: IPSec mode, authentication algorithm, authentication key.

74. The method according to claim 55, further comprising the step of rejecting said packet if an error is received from said VPN security processor.

75. The method according to claim 55, wherein said method is implemented in an Application Specific Integrated Circuit (ASIC).

76. The method according to claim 55, wherein said method is implemented in a Field Programmable Gate Array (FPGA).

77. The method according to claim 55, wherein said method is implemented in a Digital Signal Processor (DSP).

78. A computer readable storage medium having computer readable program code means embodied therein for causing a suitably programmed computer to a security association mechanism when such program is executed on said computer, said computer readable storage medium comprising:

computer readable program code means for causing said computer to establish a security association database for storing security related data for a plurality of security associations, each entry comprising security association related data corresponding to a unique socket;

computer readable program code means for causing said computer to open a new security association upon receipt of a socket not found in said security association database;

computer readable program code means for causing said computer to search for and recognizing a security association associated with a packet in accordance with its socket;

computer readable program code means for causing said computer to retrieve from said security association database a plurality of security related parameters; and computer readable program code means for causing said computer to forward said plurality of security related parameters to a Virtual Private Networking (VPN) security processor for performing one or more security processes therewith.

* * * * *